United States Patent
Abe

(10) Patent No.: US 12,234,358 B2
(45) Date of Patent: Feb. 25, 2025

(54) POLYAMIDE RESIN COMPOSITION COMPRISING SPECIFIC IONOMER

(71) Applicants: JAPAN POLYETHYLENE CORPORATION, Tokyo (JP); JAPAN POLYPROPYLENE CORPORATION, Tokyo (JP)

(72) Inventor: Kazunari Abe, Kanagawa (JP)

(73) Assignees: JAPAN POLYETHYLENE CORPORATION, Tokyo (JP); JAPAN POLYPROPYLENE CORPORATION, Tokyo (JP)

( * ) Notice: Subject to any disclaimer, the term of this patent is extended or adjusted under 35 U.S.C. 154(b) by 703 days.

(21) Appl. No.: 17/599,889

(22) PCT Filed: Apr. 1, 2020

(86) PCT No.: PCT/JP2020/014999
§ 371 (c)(1),
(2) Date: Sep. 29, 2021

(87) PCT Pub. No.: WO2020/204063
PCT Pub. Date: Oct. 8, 2020

(65) Prior Publication Data
US 2022/0169847 A1    Jun. 2, 2022

(30) Foreign Application Priority Data

Apr. 2, 2019 (JP) ................................. 2019-070502

(51) Int. Cl.
*C08L 77/00* (2006.01)
*C08F 210/02* (2006.01)

(52) U.S. Cl.
CPC ............ *C08L 77/00* (2013.01); *C08F 210/02* (2013.01)

(58) Field of Classification Search
CPC .................. C08F 210/02; C08F 220/18; C08F 220/1802–1818; C08F 8/44; C08L 23/02; C08L 23/025; C08L 23/08; C08L 23/0869; C08L 23/0876; C08L 23/26; C08L 77/00–12
See application file for complete search history.

(56) References Cited

U.S. PATENT DOCUMENTS

| | | | |
|---|---|---|---|
| 3,264,272 | A | 8/1966 | Rees |
| 2017/0306134 | A1 | 10/2017 | Hattori et al. |

FOREIGN PATENT DOCUMENTS

| | | | |
|---|---|---|---|
| JP | 55-41659 | | 3/1980 |
| JP | 2002226703 | A * | 8/2002 |
| JP | 2007-204674 | | 8/2007 |
| JP | 2013-095793 | | 5/2013 |
| JP | 2015-025126 | | 2/2015 |
| JP | 2015-163692 | | 9/2015 |
| JP | 2016-079408 | | 5/2016 |
| WO | 2016/060218 | | 4/2016 |

OTHER PUBLICATIONS

JP 2013095793 A machine translation (May 2013).*
JP-2002226703- A machine translation (Aug. 2002).*
International Search Report issued in International Bureau of WIPO Patent Application No. PCT/JP2020/014999, dated Jun. 23, 2020, along with an English translation thereof.

* cited by examiner

*Primary Examiner* — Ana L. Woodward
(74) *Attorney, Agent, or Firm* — Greenblum & Bernstein, P.L.C.

(57) ABSTRACT

A polyamide resin composition comprising a polyamide resin (I) and an ionomer (II), wherein the ionomer resin (II) is substantially linear. The resin composition has more excellent impact resistance than a conventional resin composition.

11 Claims, 1 Drawing Sheet

POLYAMIDE RESIN COMPOSITION COMPRISING SPECIFIC IONOMER

FIELD OF THE INVENTION

The present invention relates to a polyamide resin composition comprising a novel ionomer.

BACKGROUND ART

Polyamide resins have excellent properties, such as mechanical properties, heat resistance, electrical properties, and molding processability, and therefore have been widely used in automotive parts, exterior parts, mechanical parts, electric and electronic parts and others. These parts are molded articles having a variety of shapes and used in various applications and environments, but the polyamide resin inherently has poor impact resistance, and thus poses a problem in that it is difficult to expand the use of the polyamide resin in the application in which the resin is required to have toughness.

As a method for improving the impact resistance of the polyamide resin, addition of an ionomer resin as a modifier to the polyamide resin has been studied. For example, Japanese Examined Patent Publication No. Sho 55-41659 has proposed an intimate mixture of 50 to 95% by weight of a polyamide and 5 to 50% by weight of an ethylene ionomer resin and/or a carboxy-modified nitrile rubber. As another example, Japanese Unexamined Patent Publication No. 2015-163692 has proposed a thermoplastic resin composition comprising, relative to 100 parts by weight of a polyolefin thermoplastic resin having a bridged structure due to metal ions between the molecules and/or in the molecule, 5 to 100 parts by weight of a polyamide resin having a specific melting point. In Japanese Unexamined Patent Publication No. 2007-204674, an ionomer is incorporated into a specific polyamide in a predetermined proportion for improving the moldability of the polyamide. In these patent documents, for the purpose of modifying the polyamide resin in physical properties, such as an impact resistance, a conventionally and generally commercially available ionomer is used.

An ionomer is a synthetic resin having a polymer which has undergone aggregation with metal ions, and there has been known an ethylene ionomer which is a resin having an ethylene-unsaturated carboxylic acid copolymer as a precursor resin and being intermolecularly bonded with ions of a metal, such as sodium or zinc (U.S. Pat. No. 3,264,272). The ethylene ionomer has features such that it is not only tough and elastic but also flexible and has a wear resistance and transparency.

As a currently commercially available ethylene ionomer, "Surlyn (registered trademark)" that Dupont Co. has developed, which is a sodium salt or zinc salt of an ethylene-methacrylic acid copolymer; "HIMILAN (registered trademark)" that is put on the market by Dow-Mitsui Polychemicals Co., Ltd., and others have been known.

However, in the ethylene-unsaturated carboxylic acid copolymer as a precursor resin used in all these commercially available ethylene ionomers, a polar group-containing olefin copolymer obtained by polymerization of ethylene and a polar group-containing monomer, such as an unsaturated carboxylic acid, by a high-pressure radical polymerization method is used. The high-pressure radical polymerization method has an advantage in that relatively inexpensive polymerization can be made irrespective of the type of the polar group-containing monomer. However, the polar group-containing olefin copolymer produced by the high-pressure radical polymerization method has a molecular structure having a large amount of long-chain branches and short-chain branches irregularly arranged, like the imaginary structure shown in FIG. 1, and hence has a disadvantage in that the strength is unsatisfactory.

For removing the disadvantage of the polar group-containing olefin copolymer obtained by a high-pressure radical polymerization method, studies have been made on the method for producing a polar group-containing olefin copolymer having a molecular structure which is linear, like the imaginary molecular structure shown in FIG. 2, by polymerization using a catalyst. However, a polar group-containing monomer generally causes a catalytic poison, and hence polymerization of the polar group-containing monomer using a catalyst is difficult. Therefore, it is difficult to obtain a polar group-containing olefin copolymer having desired physical properties by a commercially inexpensive and stable method.

Recently, there has been proposed a method of commercially inexpensively and stably obtaining a polar group-containing olefin copolymer having a molecular structure which is substantially linear by using the novel catalyst and novel method developed by the present applicant and others.

Further, the present applicant and others have reported that a copolymer of ethylene and t-butyl acrylate is produced using a late transition metal catalyst as a method for producing a polar group-containing olefin copolymer which is a precursor resin of an ethylene ionomer, and the obtained polar group-containing olefin copolymer is subjected to heat or acid treatment to modify the copolymer to an ethylene-acrylic acid copolymer, and then the resultant copolymer is reacted with metal ions, so that a binary ionomer is successfully produced (Japanese Unexamined Patent Publication No. 2016-79408).

PRIOR ART REFERENCES

Patent Documents

Patent document 1: Japanese Examined Patent Publication No. Sho 55-41659

Patent document 2: Japanese Unexamined Patent Publication No. 2015-163692

Patent document 3: Japanese Unexamined Patent Publication No. 2007-204674

Patent document 4: U.S. Pat. No. 3,264,272

Patent document 5: Japanese Unexamined Patent Publication No. 2016-79408

SUMMARY OF THE INVENTION

Problems to be Solved by the Invention

With respect to the modification of polyamide, various attempts have been made, but the ionomers described in Japanese Examined Patent Publication No. Sho 55-41659 and Japanese Unexamined Patent Publication Nos. 2015-163692 and 2007-204674 are produced by a high-pressure radical polymerization method and have a structure having a large amount of long-chain branches and short-chain branches irregularly arranged, and therefore are unsatisfactory in respect of the strength. The ionomer, which is a modifier, itself has a problem about the strength, and the improvement of the impact resistance of the polyamide resin composition is not satisfactory. Further, especially in Japanese Unexamined Patent Publication No. 2007-204674, an effect can be obtained only for the polyamide in a specific blend, and such effect is unsatisfactory from the viewpoint of imparting physical properties on the basis of an ionomer.

In view of the above prior art techniques, an object of the present invention is to provide a modifier which can cause a polyamide resin to have excellent impact resistance, and a polyamide resin composition which is improved in impact resistance by virtue of having the modifier incorporated thereinto.

Means for Solving the Problems

The present inventors have conducted studies with a view toward solving the above-mentioned problems. As a result, it has been found that the use of a specific ionomer resin exhibits an excellent effect in respect of the impact resistance of a resin comprising a polyamide.

The ethylene ionomer described in Japanese Unexamined Patent Publication No. 2016-79408 is an unconventional and novel ethylene ionomer such that the precursor resin of the ionomer has a molecular structure which is substantially linear and further has a function of an ionomer, and the physical properties and others of the ionomer are totally different from those of a conventional ethylene ionomer, and properties characteristic of and uses of the novel ethylene ionomer are unknown. It has unexpectedly been found that the substantially linear ethylene ionomer has excellent effect in respect of the improvement of impact resistance of a polyamide resin, and the present invention has been completed, based on the above finding.

Specifically, the first embodiment of the present invention is a polyamide resin composition comprising a polyamide resin (I) and an ionomer (II), wherein the ionomer (II) is derived from a copolymer (P) comprising, as essential constituent units, structural units (A) derived from ethylene and/or an α-olefin having 3 to 20 carbon atoms and structural units (B) derived from a monomer having a carboxyl group and/or a dicarboxylic anhydride group, wherein at least part of the carboxyl group and/or dicarboxylic anhydride group in the copolymer (P) has been converted to a metal-containing carboxylic acid salt containing ions of at least one metal selected from metals belonging to Groups 1, 2, and 12 of the Periodic Table, and wherein the ionomer has a phase angle δ of 50 to 75 degrees at a complex modulus absolute value G* of 0.1 MPa, as measured by a rotational rheometer.

Effects of the Invention

By the present invention, a polyamide resin composition having excellent impact resistance can be obtained. The polyamide resin composition of the present invention comprising the ionomer having a substantially linear chain structure in the present invention has excellent impact resistance, as compared to a conventional polyamide resin composition, and therefore is useful as a material required to have toughness.

MODE FOR CARRYING OUT THE INVENTION

Figure 1:
FIG. 1 is a view diagrammatically showing the molecular structure of a polar group-containing olefin copolymer produced by a high-pressure radical polymerization method.
Figure 2:
FIG. 2 is a view diagrammatically showing the molecular structure of a polar group-containing olefin copolymer obtained by polymerization using a catalyst.

The present invention is a polyamide resin composition using an ionomer as a modifier, wherein the ionomer is derived from, as a precursor resin, copolymer (P) comprising, as essential constituent units, structural units (A) derived from ethylene and/or an α-olefin having 3 to 20 carbon atoms and structural units (B) derived from a monomer having a carboxyl group and/or a dicarboxylic anhydride group, structural units (A) and (B) being copolymerized, preferably random-copolymerized into a substantially linear copolymer, wherein at least part of the carboxyl group and/or dicarboxylic anhydride group of structural units (B) has been converted to a metal-containing carboxylic acid salt containing ions of at least one metal selected from metals belonging to Groups 1, 2, and 12 of the Periodic Table.

Hereinbelow, the ionomer in the present invention, the polyamide resin composition comprising the ionomer, and use thereof and others will be described in detail in the respective items. In the present specification, the term "(meth)acrylic acid" means acrylic acid or methacrylic acid. Further, in the present specification, the range of values indicated using the preposition "to" means a range of values including the respective values shown before and after the preposition "to" as the lower limit and the upper limit.

1. Polyamide Resin (I)

The polyamide resin is a polymer having an amide linkage in the molecular chain thereof, which can be obtained by, for example, ring-opening polymerization of a lactam which is a three- or more membered ring, polycondensation of an aminocarboxylic acid, or polycondensation of a dicarboxylic acid and a diamine. Specific examples of lactams used in ring-opening polymerization include s-caprolactam, enantholactam, and lauryllactam. Specific examples of aminocarboxylic acids used in polycondensation include 6-aminocaproic acid, 7-aminoheptanoic acid, 8-aminooctanoic acid, 9-aminononanoic acid, 11-aminoundecanoic acid, and 12-aminododecanoic acid. Specific examples of monomers used in polycondensation of a dicarboxylic acid and a diamine include arbitrary combinations of a diamine and a dicarboxylic acid, the diamine being such as 1,4-butanediamine, 1,5-pentanediamine, 1,6-hexanediamine, 1,5-hexanediamine, 1,9-nonanediamine, 1,11-undecanediamine, 1,12-dodecanediamine, α,ω-diaminopolypropylene glycol, or m- or p-phenylenediamine, and a dicarboxylic acid being such as adipic acid, sebacic acid, dodecanedioic acid, glutaric acid, terephthalic acid, or isophthalic acid. The polyamide resin may be a copolymer obtained from two or more different monomers, or may be a blend of homopolymers or copolymers in an arbitrary proportion.

With respect to the polyamide resin, a polyamide resin of a commercially available grade can be used, and specific examples of more preferred polyamides include 6-nylon, 6,6-nylon, 6,10-nylon, 12-nylon, 11-nylon, 9-nylon, 7-nylon, polyamide 4,6, polyamide 6,12, polymetaxylyleneadipamide, aromatic nylon, for example, polyamide 6T, polyamide 9T, and polyamide 10T. These polyamide resins can be used individually or in combination.

The end of the polyamide resin may be capped by a carboxylic acid or amine having 6 to 22 carbon atoms. Specific examples of carboxylic acids used in capping the end include aliphatic monocarboxylic acids, such as caproic acid, caprylic acid, capric acid, lauric acid, myristic acid, palmitic acid, stearic acid, and behenic acid. Specific examples of amines include aliphatic primary amines, such as hexylamine, octylamine, decylamine, laurylamine, myristylamine, palmitylamine, stearylamine, and behenylamine.

The polyamide resin can be freely controlled to some extent according to the specific use thereof, but preferred is a polyamide resin having a molecular weight in a certain range. The length of molecular chain, i.e., molecular weight of a polymer can also be expressed by the relative viscosity (ηr) of the polymer. The polyamide resin preferably has a relative viscosity in the range of from 1.5 to 5.0, more preferably in the range of from 2.0 to 5.0, as measured in 98% sulfuric acid at a resin concentration of 1% and at a temperature of 25° C. in accordance with JIS K6810.

With respect to the amount of the polyamide resin in the resin composition, there is no particular limitation, but the amount of the polyamide resin contained is preferably 0.1 to 99.9% by weight, based on the total weight of the polyamide resin and the below-mentioned ionomer resin. The amount of the polyamide resin is more preferably in the range of from 0.5 to 99.0% by weight, further preferably in the range of from 1.0 to 95.0% by weight, based on the total weight of the polyamide resin and the ionomer resin. When the amount of the polyamide resin is in the above range, there can be obtained the polyamide resin composition which not only satisfies physical properties required for a resin, such as moldability, but also has more excellent impact resistance.

2. Ionomer

The ionomer in the present invention is derived from copolymer (P) as a precursor resin, wherein copolymer (P) comprises, as essential constituent units, structural units (A) derived from ethylene and/or an α-olefin having 3 to 20 carbon atoms and structural units (B) derived from a monomer having a carboxyl group and/or a dicarboxylic anhydride group, structural units (A) and (B) being copolymerized, preferably random-copolymerized into a substantially linear copolymer, wherein at least part of the carboxyl group and/or dicarboxylic anhydride group of structural units (B) has been converted to a metal-containing carboxylic acid salt containing ions of at least one metal selected from metals belonging to Groups 1, 2, and 12 of the Periodic Table.

(1) Structural Units (A)

Structural units (A) are at least one type of structural units selected from the group consisting of structural units derived from ethylene and structural units derived from an α-olefin having 3 to 20 carbon atoms.

The α-olefin in the present invention is an α-olefin having 3 to 20 carbon atoms and being represented by the structural formula: $CH_2=CHR^{18}$ (wherein $R^{18}$ is a hydrocarbon group having 1 to 18 carbon atoms, and may be of a linear chain structure or have a branch). The α-olefin more preferably has 3 to 12 carbon atoms.

Specific examples of structural units (A) include ethylene, propylene, 1-butene, 1-pentene, 1-hexene, 1-octene, 1-decene, 3-methyl-1-butene, and 4-methyl-1-pentene, and structural units (A) may be ethylene.

Structural units (A) contained in the ionomer may be of a single type or of two or more types. Examples of combinations of two types of structural units (A) include ethylene-propylene, ethylene-1-butene, ethylene-1-hexene, ethylene-1-octene, propylene-1-butene, propylene-1-hexene, and propylene-1-octene. Examples of combinations of three types of structural units (A) include ethylene-propylene-1-butene, ethylene-propylene-1-hexene, ethylene-propylene-1-octene, propylene-1-butene-hexene, and propylene-1-butene-1-octene.

In the present invention, it is preferred that structural units (A) essentially comprise ethylene and, if necessary, further comprise one or more α-olefins having 3 to 20 carbon atoms.

The amount of ethylene in structural units (A) may be 65 to 100 mol %, and may be 70 to 100 mol %, based on the total mol of structural units (A).

(2) Structural Units (B)

Structural units (B) are structural units derived from a monomer having a carboxyl group and/or a dicarboxylic anhydride group.

Specific examples of monomers having a carboxyl group include unsaturated carboxylic acids, such as acrylic acid, methacrylic acid, maleic acid, fumaric acid, tetrahydrophthalic acid, itaconic acid, citraconic acid, crotonic acid, isocrotonic acid, norbornenedicarboxylic acid, and bicyclo[2.2.1]hept-2-ene-5,6-dicarboxylic acid, and specific examples of monomers having a dicarboxylic anhydride group include unsaturated dicarboxylic anhydrides, such as maleic anhydride, itaconic anhydride, citraconic anhydride, tetrahydrophthalic anhydride, 5-norbornene-2,3-dicarboxylic anhydride, 3,6-epoxy-1,2,3,6-tetrahydrophthalic anhydride, tetracyclo[$6.2.1.1^{3,6}.0^{2,7}$]dodec-9-ene-4,5-dicarboxylic anhydride, and 2,7-octadien-1-ylsuccinic anhydride.

As a specific compound, there can be mentioned acrylic acid, methacrylic acid, and 5-norbornene-2,3-dicarboxylic anhydride, and particularly, the monomer may be acrylic acid.

Further, the monomer having a carboxyl group and/or a dicarboxylic anhydride group may be of a single type or of two or more types.

There is a case that the dicarboxylic anhydride group is reacted with water in air to suffer ring opening, so that part of the dicarboxylic anhydride is changed to a dicarboxylic acid, but the dicarboxylic anhydride group may suffer ring opening as long as the effects aimed at by the present invention are not sacrificed.

(3) Additional Structural Units (C)

Copolymer (P) in the present invention may comprise structural units (C) other than the structural units shown by structural units (A) and structural units (B) (hereinafter, frequently referred to as "optional monomer (C)"). With respect to the monomer that gives structural units (C), any arbitrary optional monomer can be used as long as the optional monomer is not the same as the monomers that give structural units (A) and structural units (B). The optional monomer that gives structural units (C) is not limited as long as the optional monomer is a compound having at least one carbon-carbon double bond in the molecular structure thereof, but there can be mentioned, for example, an acyclic monomer represented by the following general formula (1) and a cyclic monomer represented by the following general formula (2).

Acyclic Monomer

[Chemical formula 1]

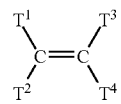

(1)

Wherein, in the general formula (1), each of $T^1$ to $T^3$ is independently a substituent selected from the group consisting of a hydrogen atom, a hydrocarbon group having 1 to 20 carbon atoms, a hydrocarbon group having 1 to 20 carbon atoms and being substituted with a hydroxyl group, a hydrocarbon group having 2 to 20 carbon atoms and being substituted with an alkoxy group having 1 to 20 carbon atoms, a hydrocarbon group having 3 to 20 carbon atoms and being substituted with an ester group having 2 to 20 carbon atoms, a hydrocarbon group having 1 to 20 carbon atoms and being substituted with a halogen atom, an alkoxy group having 1 to 20 carbon atoms, an aryl group having 6 to 20 carbon atoms, an ester group having 2 to 20 carbon atoms, a silyl group having 3 to 20 carbon atoms, a halogen atom, and a cyano group, and $T^4$ is a substituent selected from the group consisting of a hydrocarbon group having 1 to 20 carbon atoms and being substituted with a hydroxyl group, a hydrocarbon group having 2 to 20 carbon atoms and being substituted with an alkoxy group having 1 to 20 carbon atoms, a hydrocarbon group having 3 to 20 carbon atoms and being substituted with an ester group having 2 to 20 carbon atoms, a hydrocarbon group having 1 to 20 carbon atoms and being substituted with a halogen atom, an alkoxy group having 1 to 20 carbon atoms, an aryl group having 6 to 20 carbon atoms, an ester group having 2 to 20 carbon atoms, a silyl group having 3 to 20 carbon atoms, a halogen atom, and a cyano group.

In the ionomer in the present invention, $T^1$ and $T^2$ may be a hydrogen atom, $T^3$ may be a hydrogen atom or a methyl group, and $T^4$ may be an ester group having 2 to 20 carbon atoms.

With respect to the hydrocarbon group, substituted alkoxy group, substituted ester group, alkoxy group, aryl group, ester group, and silyl group for $T^1$ to $T^4$, the carbon skeleton of the group may have a branch, a ring, and/or an unsaturated bond.

With respect to the number of carbon atoms of the hydrocarbon group for $T^1$ to $T^4$, the lower limit may be 1 or more, and the upper limit may be 20 or less, and may be 10 or less.

With respect to the number of carbon atoms of the substituted alkoxy group for $T^1$ to $T^4$, the lower limit may be 1 or more, and the upper limit may be 20 or less, and may be 10 or less.

With respect to the number of carbon atoms of the substituted ester group for $T^1$ to $T^4$, the lower limit may be 2 or more, and the upper limit may be 20 or less, and may be 10 or less.

With respect to the number of carbon atoms of the alkoxy group for $T^1$ to $T^4$, the lower limit may be 1 or more, and the upper limit may be 20 or less, and may be 10 or less.

With respect to the number of carbon atoms of the aryl group for $T^1$ to $T^4$, the lower limit may be 6 or more, and the upper limit may be 20 or less, and may be 11 or less.

With respect to the number of carbon atoms of the ester group for $T^1$ to $T^4$, the lower limit may be 2 or more, and the upper limit may be 20 or less, and may be 10 or less.

With respect to the number of carbon atoms of the silyl group for $T^1$ to $T^4$, the lower limit may be 3 or more, and the upper limit may be 18 or less, and may be 12 or less. Examples of silyl groups include a trimethylsilyl group, a triethylsilyl group, a tri-n-propylsilyl group, a triisopropylsilyl group, a dimethylphenylsilyl group, a methyldiphenylsilyl group, and a triphenylsilyl group.

Specific examples of acyclic monomers include (meth) acrylates.

The (meth)acrylate in the present invention is a compound represented by the structural formula: $CH_2=C(R^{21})CO_2(R^{22})$. In the structural formula, $R^{21}$ is a hydrogen atom or a hydrocarbon group having 1 to 10 carbon atoms and may have a branch, a ring, and/or an unsaturated bond. $R^{22}$ is a hydrocarbon group having 1 to 20 carbon atoms and may have a branch, a ring, and/or an unsaturated bond. Further, the compound may contain a heteroatom in an arbitrary position of $R^{22}$.

As examples of the (meth)acrylate, there can be mentioned (a)an (meth)acrylate corresponding to a compound represented by the above structural formula wherein $R^{21}$ is a hydrogen atom or a hydrocarbon group having 1 to 5 carbon atoms. Further, there can be mentioned an acrylate corresponding to a compound represented by the above structural formula wherein $R^{21}$ is a hydrogen atom, and a methacrylate corresponding to a compound represented by the above structural formula wherein $R^{21}$ is a methyl group.

Specific examples of (meth)acrylates include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth) acrylate, octyl (meth)acrylate, 2-ethylhexyl (meth)acrylate, nonyl (meth)acrylate, decyl (meth)acrylate, dodecyl (meth) acrylate, octadecyl (meth)acrylate, phenyl (meth)acrylate, tolyl (meth)acrylate, and benzyl (meth)acrylate.

As specific examples of the compounds, there can be mentioned methyl acrylate, ethyl acrylate, n-butyl (nBA) acrylate, isobutyl (iBA) acrylate, t-butyl (tBA) acrylate, and 2-ethylhexyl acrylate, and particularly, the compound may be n-butyl (nBA) acrylate, isobutyl (iBA) acrylate, or t-butyl (tBA) acrylate.

A single type of the acyclic monomer may be used, or two or more types of the acyclic monomers may be used.

Cyclic Monomer

[Chemical formula 2]

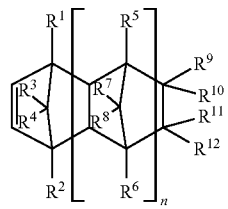

(2)

Wherein, in the general formula (2), $R^1$ to $R^{12}$ may be the same or different and are selected from the group consisting of a hydrogen atom, a halogen atom, and a hydrocarbon group having 1 to 20 carbon atoms, wherein $R^9$ and $R^{10}$, and $R^{11}$ and $R^{12}$ may unify to form a divalent organic group, and $R^9$ or $R^{10}$, and $R^{11}$ or $R^{12}$ may together form a ring, and n represents 0 or a positive integer, and, when n is 2 or more, $R^5$ to $R^8$ may be the same or different in their respective repeating units.

Examples of the cyclic monomers include norbornene olefins, e.g., compounds having a cyclic olefin skeleton, such as norbornene, vinylnorbornene, ethylidenenorbornene, norbornadiene, tetracyclododecene, tricyclo[4.3.0.1$^{2,5}$]dec-1-ene, and tricyclo[4.3.0.1$^{2,5}$]dec-3-ene, and the cyclic monomer may be, for example, 2-norbornene (NB) or tetracyclo[6.2.1.1$^{3,6}$0.0$^{2,7}$]dodec-4-ene.

(4) Metal Ions

The ionomer contains metal ions which form a salt, together with the carboxyl group and/or dicarboxylic anhydride group of structural units (B) mentioned in item (2) above. Examples of the metal ions for the carboxylic acid salt group include ions of a monovalent or bivalent metal belonging to a Group selected from the group consisting of Groups 1, 2, and 12 of the Periodic Table. Specific examples of the metal ions include ions of lithium (Li), sodium (Na), potassium (K), rubidium (Rb), magnesium (Mg), calcium (Ca), or zinc (Zn), and, from the viewpoint of easy handling, particularly, the metal ions may be ions of sodium (Na) or zinc (Zn).

The carboxylic acid salt group can be obtained by, for example, after or while subjecting the ester group of the copolymer to hydrolysis or heat decomposition, reacting the copolymer with a compound containing ions of a metal belonging to Group 1, 2, or 12 of the Periodic Table to convert the ester group portion of the copolymer to a metal-containing carboxylic acid salt.

The metal ions may be of a single type or of two or more types.

(5) Copolymer (P)

Copolymer (P), which is a precursor resin of the ionomer used in the present invention, comprises, as essential constituent units, structural units (A) derived from ethylene and/or an α-olefin having 3 to 20 carbon atoms and structural units (B) derived from a monomer having a carboxyl group and/or a dicarboxylic anhydride group, wherein structural units (A) and (B) are copolymerized, preferably random-copolymerized into a substantially linear copolymer. The term "substantially linear" indicates that the copolymer has no branch or has a reduced frequency of the occurrence of a branched structure, and thus is in a state such that the copolymer can be considered to be linear. Specifically, the term indicates the state that the copolymer has a phase angle δ of 50 degrees or more, as measured under the conditions shown below.

It is necessary that the copolymer in the present invention contain at least one type of each of structural units (A) and structural units (B) and comprise two or more in total types of monomer units, and the copolymer may further comprise additional structural units (C).

The structural units of the copolymer in the present invention and the structural unit content are described below.

With respect to each of ethylene and/or an α-olefin having 3 to 20 carbon atoms (A), monomer having a carboxyl group and/or a dicarboxylic anhydride group (B), and optional monomer (C), the structure derived from one molecule is defined as one type of structural units in the copolymer.

The ratio of each one type of structural units to the total of the structural units in the copolymer (100 mol %) is a structural unit content indicated by mol %.

Structural Unit Content for Ethylene and/or an α-Olefin Having 3 to 20 Carbon Atoms (A):

With respect to the structural unit content for structural units (A) in the present invention, the lower limit is 60.000 mol % or more, preferably 70.000 mol % or more, more preferably 80.000 mol % or more, further preferably 85.000 mol % or more, further more preferably 90.000 mol % or more, especially preferably 91.200 mol % or more, and the upper limit is selected from 97.999 mol % or less, preferably 97.990 mol % or less, more preferably 97.980 mol % or less, further preferably 96.980 mol % or less, further more preferably 96.900 mol % or less, especially preferably 92.700 mol % or less.

When the structural unit content derived from ethylene and/or an α-olefin having 3 to 20 carbon atoms (A) is smaller than 60.000 mol %, it is likely that the polyamide resin composition has poor rigidity, and, when the structural unit content is larger than 97.999 mol %, it is likely that the improvement effect for the polyamide resin composition becomes poor.

Structural Unit Content Derived from Monomer Having a Carboxyl Group and/or a Dicarboxylic Anhydride Group (B):

With respect to the structural unit content for structural units (B) in the present invention, the lower limit is 2.0 mol % or more, preferably 2.9 mol % or more, more preferably 5.2 mol % or more, and the upper limit is selected from 20.0 mol % or less, preferably 15.0 mol % or less, more preferably 10.0 mol % or less, further preferably 8.0 mol % or less, especially preferably 5.4 mol % or less.

When the structural unit content derived from monomer having a carboxyl group and/or a dicarboxylic anhydride group (B) is smaller than 2.0 mol %, it is likely that the ionomer formed from copolymer (P) as a precursor resin has unsatisfactory dispersibility in the polyamide resin, so that the impact resistance improvement effect becomes poor, and, when the structural unit content is larger than 20.0 mol %, it is likely that satisfactory mechanical physical properties of the polyamide resin composition cannot be obtained.

Structural Unit Content for Optional Monomer (C):

With respect to the structural unit content for structural units (C) in the present invention, when structural units (C) are contained, the lower limit is 0.001 mol % or more, preferably 0.010 mol % or more, more preferably 0.020 mol % or more, further preferably 0.100 mol % or more, further more preferably 1.000 mol % or more, especially preferably 1.900 mol % or more, and the upper limit is selected from 20.000 mol % or less, preferably 15.000 mol % or less, more preferably 10.000 mol % or less, further preferably 5.000 mol % or less, especially preferably 3.600 mol % or less.

Further, the optional monomers may be used individually or in combination.

Number of Branches Per 1,000 Carbon Atoms in the Copolymer:

In the molecular structure of polyolefin, it is likely that a short carbon chain having about 1 to 4 carbon atoms, such as methyl, ethyl, or butyl, appears as a branch. The copolymer in the present invention has no branch or has a reduced frequency of the occurrence of a branched structure, and thus has a structure such that the copolymer can be considered to be linear.

In the copolymer, in view of increasing the modulus to obtain satisfactory mechanical physical properties, with respect to the number of methyl branches per 1,000 carbon atoms, as determined by $^{13}$C-NMR, the upper limit may be 50 or less, may be 5.0 or less, may be 1.0 or less, and may be 0.5 or less. The lower limit of the number of methyl branches is not particularly limited, and the smaller the lower limit is, the better. With respect to the number of ethyl branches per 1,000 carbon atoms, the upper limit may be 3.0 or less, may be 2.0 or less, may be 1.0 or less, and may be 0.5 or less. The lower limit of the number of ethyl branches is not particularly limited, and the smaller the lower limit is, the better. Further, with respect to the number of butyl branches per 1,000 carbon atoms, the upper limit may be 7.0 or less, may be 5.0 or less, may be 3.0 or less, and may be 0.5 or less. The lower limit of the number of butyl branches is not particularly limited, and the smaller the lower limit is, the better.

Method for measuring the structural units derived from a carboxyl group and/or dicarboxylic anhydride group monomer and the number of branches in the copolymer:

The structural units derived from a carboxyl group and/or dicarboxylic anhydride group monomer and the number of branches per 1,000 carbon atoms in the multi-component copolymer in the present invention are determined using a $^{13}$C-NMR spectrum. $^{13}$C-NMR is measured by the following method.

200 to 300 mg of a sample is placed in an NMR sample tube having an inner diameter of 10 mmφ, together with 2.4 ml of a mixed solvent of o-dichlorobenzene ($C_6H_4Cl_2$) and deuterated bromobenzene ($C_6D_5Br$) ($C_6H_4Cl_2/C_6D_5Br=2/1$ (volume ratio)) and hexamethyldisiloxane as a chemical shift standard substance, and the tube is purged with nitrogen gas and then sealed, and the sample is dissolved by heating to obtain a uniform solution, and the obtained solution is used as a sample for NMR measurement.

The NMR measurement is conducted at 120° C. using NMR apparatus Model AV400M, manufactured by Bruker Japan K.K., having 10 mmφ Cryoprobe attached.

The $^{13}$C-NMR measurement is performed by an inverse gated decoupling method under conditions such that the sample temperature is 120° C., the pulse angle is 90°, the pulse interval is 51.5 seconds, and the accumulation number is 512 or more.

With respect to the chemical shift, the $^{13}$C signal of hexamethyldisiloxane is set to 1.98 ppm, and, using this signal as a reference, chemical shifts of other $^{13}$C signals are determined.

In the obtained $^{13}$C-NMR, signals characteristic of the monomers or branches of the copolymer are identified, and the intensities of the signals are compared, enabling analysis of a structural unit content of each monomer in the copolymer and the number of branches. The positions of signals characteristic of the monomers or branches can be found with reference to known materials, or can be individually identified according to the sample. Such a method of analysis can be generally carried out by those skilled in the art.

Weight Average Molecular Weight (Mw) and Molecular Weight Distribution (Mw/Mn):

With respect to the weight average molecular weight (Mw) of the copolymer in the present invention, the lower limit is generally 1,000 or more, preferably 6,000 or more, and the upper limit is generally 2,000,000 or less, preferably 1,500,000 or less, further preferably 1,000,000 or less, especially preferably 800,000 or less, most preferably 56,000 or less.

When the Mw is less than 1,000, the copolymer is likely to be unsatisfactory in physical properties, such as a mechanical strength and an impact resistance, and, when the Mw is more than 2,000,000, it is likely that the copolymer has such a high melt viscosity that molding processing for the copolymer is difficult.

In the copolymer in the present invention, the ratio of the weight average molecular weight (Mw) to the number average molecular weight (Mn) (Mw/Mn) is generally in the range of from 1.5 to 4.0, preferably 1.6 to 3.5, further preferably 1.9 to 2.3. When the Mw/Mn is less than 1.5, the copolymer is likely to be unsatisfactory in various types of processability including moldability, and, when the Mw/Mn is more than 4.0, the copolymer is likely to have poor mechanical physical properties.

In the present invention, the (Mw/Mn) is frequently expressed as a molecular weight distribution parameter.

The weight average molecular weight (Mw) and number average molecular weight (Mn) in the present invention are determined by gel permeation chromatography (GPC). The molecular weight distribution parameter (Mw/Mn) is obtained by further determining a number average molecular weight (Mn) by gel permeation chromatography (GPC), and calculating the ratio of Mw to Mn, i.e., Mw/Mn.

An example of the measurement method for GPC in the present invention is as follows.

(Conditions for Measurement)
  Type of the apparatus used: 150C, manufactured by Waters Corporation
  Detector: MIRAN1A•IR detector, manufactured by FOXBORO Company (measuring wavelength: 3.42 μm)
  Measuring temperature: 140° C.
  Solvent: Orthodichlorobenzene (ODCB)
  Column: AD806M/S, manufactured by Showa Denko K.K. (3 columns)
  Flow rate: 1.0 mL/minute
  Amount of a sample per injection: 0.2 mL (Preparation of a Sample)
  Using ODCB (containing BHT (2,6-di-t-butyl-4-methylphenol) in an amount of 0.5 mg/mL), a 1 mg/mL solution of a sample is prepared and the sample is dissolved at 140° C. over about one hour.

(Determination of a Molecular Weight (M))
  The determination of a molecular weight is conducted by a standard polystyrene method, and conversion to a molecular weight from the retention volume is made using a calibration curve preliminarily prepared from standard polystyrenes. The standard polystyrenes used are of the following grades (F380, F288, F128, F80, F40, F20, F10, F4, F1, A5000, A2500, A1000), all of which are manufactured by Tosoh Corp. 0.2 mL of a solution obtained by dissolving each sample in ODCB (containing BHT in an amount of 0.5 mg/mL) at 0.5 mg/mL is injected to prepare a calibration curve. As the calibration curve, a cubic expression obtained by approximation by a method of least squares is used. In the viscosity formula $[\eta]=K \times M\alpha$, which is used in the conversion to a molecular weight (M), the following values are used.

Polystyrene (PS): $K=1.38\times10^{-4}$, $\alpha=0.7$
  Polyethylene (PE): $K=3.92\times10^{-4}$, $\alpha=0.733$
  Polypropylene (PP): $K=1.03\times10^{-4}$, $\alpha=0.78$ Melting Point (Tm, ° C.):

The melting point of the copolymer in the present invention is indicated by a maximum peak temperature of an endothermic curve measured by a differential scanning calorimeter (DSC). The maximum peak temperature means the temperature of a peak in the endothermic curve obtained by plotting a heat flow (mW) on the ordinate and a temperature (° C.) on the abscissa in the DSC measurement, wherein when a plurality of peaks appear in the endothermic curve, the temperature of the peak having the maximum height from the base line among the peaks is determined as a maximum peak temperature, and when a single peak appears, the temperature of the peak is determined as a maximum peak temperature.

The melting point of the copolymer is preferably 50 to 140° C., further preferably 60 to 138° C., most preferably 70 to 135° C. When the melting point of the copolymer is lower than the above range, it is likely that the heat resistance is unsatisfactory, and, when the melting point is higher than the above range, it is likely that the polyamide resin composition has poor rigidity.

The melting point of the copolymer can be determined from the absorption curve obtained, for example, using DSC (DSC 7020), manufactured by SII Nano Technology Inc., by packing an aluminum pan with about 5.0 mg of a sample, and increasing the temperature to 200° C. at 10° C./minute and maintaining the temperature at 200° C. for 5 minutes, and then decreasing the temperature to 20° C. at 10°

C./minute and maintaining the temperature at 20° C. for 5 minutes, and then further increasing the temperature to 200° C. at 10° C./minute.

Crystallinity (%):

In the copolymer in the present invention, with respect to the crystallinity as measured by differential scanning calorimetry (DSC), there is no particular limitation, but the crystallinity of the copolymer is preferably more than 0%, more preferably more than 5%, further preferably 7% or more. When the crystallinity of the copolymer is 0%, it is likely that the copolymer has unsatisfactory toughness. The crystallinity can be used as an index of transparency, and the lower the crystallinity of the copolymer, the more excellent the transparency of the copolymer. In the application in which the resin composition is required to have transparency, the crystallinity of the copolymer is preferably 30% or less, further preferably 25% or less, especially preferably 25% or less, most preferably 24% or less.

A crystallinity of the copolymer can be determined by, for example, determining a heat of fusion (All) from the fusion endothermic peak area obtained by DSC measurement in accordance with the same procedure as in the above-mentioned measurement of melting point, and dividing the determined heat of fusion by the heat of fusion (293 J/g) of high density polyethylene (HDPE) perfect crystal.

Molecular Structure of the Copolymer:

The molecular chain end of the copolymer in the present invention may be structural units (A) of ethylene and/or an α-olefin having 3 to 20 carbon atoms, may be structural units (B) of a monomer having a carboxyl group and/or a dicarboxylic anhydride group, and may be structural units (C) of an optional monomer.

With respect to the copolymer in the present invention, examples of copolymers include a random copolymer, a block copolymer, and a graft copolymer of structural units (A) of ethylene and/or an α-olefin having 3 to 20 carbon atoms, structural units (B) of a monomer having a carboxyl group and/or a dicarboxylic anhydride group, and structural units (C) of an optional monomer. Of these, the copolymer may be a random copolymer which can contain structural units (B) in a large amount.

Molecular structure example (1) of a general terpolymer is shown below.

The random copolymer is a copolymer such that, in the below-shown molecular structure example (1), with respect to structural units (A) of ethylene and/or an α-olefin having 3 to 20 carbon atoms, structural units (B) of a monomer having a carboxyl group and/or a dicarboxylic anhydride group, and structural units (C) of an optional monomer, the probability of finding each structural unit in an arbitrary position of the molecular chain is irrelevant to the type of the adjacent structural unit.

As shown below, in the molecular structure example (1) of the copolymer, structural units (A) of ethylene and/or an α-olefin having 3 to 20 carbon atoms, structural units (B) of a monomer having a carboxyl group and/or a dicarboxylic anhydride group, and structural units (C) of an optional monomer form a random copolymer.

[Chemical formula 3]

-ABCAAABBCBAABACCAA-   Molecular structure example (1)

The molecular structure example (2) of the copolymer having introduced by graft modification structural units (B) of a monomer having a carboxyl group and/or a dicarboxylic anhydride group is also shown below for reference. Part of a copolymer formed by copolymerization of structural units (A) of ethylene and/or an α-olefin having 3 to 20 carbon atoms and structural units (C) of an optional monomer is graft-modified with structural units (B) of a monomer having a carboxyl group and/or a dicarboxylic anhydride group.

[Chemical formula 4]

Molecular structure example (2)

The random copolymerizability in the copolymer can be determined by various methods, but the method for determining random copolymerizability from the relationship between the comonomer content and the melting point of the copolymer is described in detail in "Japanese Unexamined Patent Publication No. 2015-163691" and "Japanese Unexamined Patent Publication No. 2016-079408". From the above documents, when the copolymer has a melting point (Tm, ° C.) which is higher than –3.74×[Z]+130 (wherein [Z] is a comonomer content/mol %), the copolymer can be judged to have low randomness.

In the copolymer in the present invention, which is a random copolymer, it is preferred that the melting point (Tm, ° C.) as measured by differential scanning calorimetry (DSC) and the total content [Z] (mol %) of structural units (B) of a monomer having a carboxyl group and/or a dicarboxylic anhydride group and structural units (C) of an optional monomer satisfy the following formula (I).

$$50 < Tm < -3.74 \times [Z] + 130 \qquad (I)$$

When the copolymer has a melting point (Tm, ° C.) which is higher than –3.74×[Z]+130 (° C.), it is likely that the random copolymerizability is low such that mechanical physical properties, such as an impact strength, are poor, and, when the copolymer has a melting point of lower than 50° C., it is likely that the heat resistance is poor.

Further, it is preferred that the copolymer in the present invention is produced in the presence of a transition metal catalyst from the viewpoint of obtaining the copolymer having a molecular structure which is linear.

It is known that the molecular structure of a copolymer varies depending on the method for producing the copolymer, for example, polymerization conducted by a high-pressure radical polymerization process, or polymerization using a metal catalyst.

The molecular structure of a copolymer can be controlled by selecting the method for producing the copolymer, but, for example, as described in Japanese Unexamined Patent Publication No. 2010-150532, the molecular structure can be presumed from a complex modulus measured by a rotational rheometer.

Phase Angle δ at a Complex Modulus Absolute Value G* of 0.1 MPa:

The copolymer in the present invention has a phase angle δ of 50 to 75 degrees at a complex modulus absolute value G* of 0.1 MPa, as measured by a rotational rheometer. The lower limit of the phase angle δ may be 51 degrees or more, may be 54 degrees or more, may be 56 degrees or more, and may be 58 degrees or more. The upper limit of the phase angle δ may be 75 degrees or less, and may be 70 degrees or less.

More specifically, when the phase angle δ (G*=0.1 MPa) at a complex modulus absolute value G* of 0.1 MPa, as measured by a rotational rheometer, is 50 degrees or more, such a value of the phase angle shows that the molecular structure of the copolymer is a linear chain structure which contains no long-chain branch, or a substantially linear chain structure which contains long-chain branches in such a small amount that causes no effect on the mechanical strength.

When the phase angle δ (G*=0.1 MPa) at a complex modulus absolute value G* of 0.1 MPa, as measured by a rotational rheometer, is less than 50 degrees, such a value of the phase angle shows that the molecular structure of the copolymer is a structure containing long-chain branches in too large an amount, and the mechanical strength tends to be poor.

The phase angle δ at a complex modulus absolute value G* of 0.1 MPa, as measured by a rotational rheometer, is affected by both the molecular weight distribution and the long-chain branch. With respect to the copolymer which satisfies: Mw/Mn≤4, more preferably Mw/Mn≤3, the phase angle can be used as an index of the amount of long-chain branches, and the larger the amount of long-chain branches contained in the molecular structure, the smaller the δ (G*=0.1 MPa) value. With respect to the copolymer in which Mw/Mn is 1.5 or more, even when the molecular structure of the copolymer is a structure containing no long-chain branch, the δ (G*=0.1 MPa) value does not exceed 75 degrees.

The method for measuring a complex modulus is as follows.

A specimen is placed in a mold for hot pressing having a thickness of 1.0 mm, and preheated in a hot pressing machine having a surface temperature of 180° C. for 5 minutes, and then a cycle of application of the pressure and reduction of the pressure is repeated for deaeration of the gas remaining in the molten resin, and further a pressure of 4.9 MPa is applied to the resin and maintained for 5 minutes. Then, the resultant specimen is transferred to a pressing machine having a surface temperature of 25° C., and cooled by maintaining it at a pressure of 4.9 MPa for 3 minutes, preparing a pressed plate having a thickness of about 1.0 mm. The pressed plate is processed into a circular form having a diameter of 25 mm and used as a sample, and, using rotational rheometer Model ARES, manufactured by Rheometrics, Inc., as a measurement apparatus for dynamic viscoelastic properties, dynamic viscoelastic properties are measured in a nitrogen gas atmosphere under the following conditions.

Plate: φ25 mm Parallel plate
Temperature: 160° C.
Strain amount: 10%
Measuring range of circular frequency: $1.0 \times 10^{-2}$ to $1.0 \times 10^2$ rad/s
Measurement interval: 5 points/decade A phase angle δ is plotted for the common logarithm log G* of a complex modulus absolute value G* (Pa), and a δ (degree) value of the point corresponding to log G*=5.0 is taken as δ (G*=0.1 MPa). When the point corresponding to log G*=5.0 is not present in the measured points, a δ value of the point for log G*=5.0 is determined by linear interpolation using two points around log G*=5.0. Further, when all the measured points correspond to log G*<5, a δ value of the point for log G*=5.0 is determined by extrapolation using a quadratic curve using three points of the larger log G* values.

With Respect to the Production of the Copolymer

It is preferred that the copolymer in the present invention is produced in the presence of a transition metal catalyst from the viewpoint of obtaining the copolymer having a molecular structure which is linear.

Polymerization Catalyst

With respect to the type of the polymerization catalyst used in producing the copolymer in the present invention, there is no particular limitation as long as the catalyst can cause structural units (A), structural units (B), and optional structural units (C) to undergo copolymerization, but, for example, there can be mentioned transition metal compounds belonging to Groups 5 to 11 of the Periodic Table and having a chelate ligand.

Specific examples of preferred transition metals include a vanadium atom, a niobium atom, a tantalum atom, a chromium atom, a molybdenum atom, a tungsten atom, a manganese atom, an iron atom, a platinum atom, a ruthenium atom, a cobalt atom, a rhodium atom, a nickel atom, a palladium atom, and a copper atom. Of these, preferred are transition metals belonging to Groups 8 to 11, further preferred are transition metals belonging to Group 10, and especially preferred are nickel (Ni) and palladium (Pd). These metals may be used individually or in combination.

The chelate ligand contains a bidentate or multidentate ligand having at least two atoms selected from the group consisting of P, N, O, and S, and is electronically neutral or anionic. Examples of the structures of chelate ligands are shown in the review by Brookhart et. al. (Chem. Rev., 2000, 100, 1169).

Preferred examples of chelate ligands include bidentate anionic P, O ligands. Examples of bidentate anionic P, O ligands include phosphorus-sulfonic acid, phosphorus-carboxylic acid, phosphorus-phenol, and phosphorus-enolate. Further examples of chelate ligands include bidentate anionic N, O ligands. Examples of bidentate anionic N, O ligands include salicylaldiminate and pyridinecarboxylic acid. Further examples of chelate ligands include a diimine ligand, a diphenoxide ligand, and a diamide ligand.

The structure of the metal complex obtained from a chelate ligand is represented by the structural formula (c1) or (c2) below, which has coordinated thereto an arylphosphine compound, arylarsine compound, or arylantimony compound optionally having a substituent.

[Chemical formula 5]

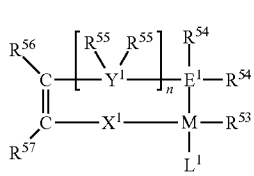

Structural formula (c1)

[Chemical formula 6]

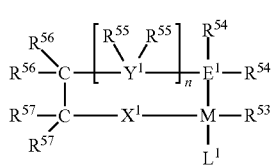

Structural formula (c2)

[In the structural formula (c1) and structural formula (c2), M represents a transition metal belonging to any one of Groups 5 to 11 of the Periodic Table of elements, i.e., the above-mentioned various transition metals.

$X^1$ represents oxygen, sulfur, —$SO_3$—, or —$CO_2$—.

$Y^1$ represents carbon or silicon.

n represents an integer of 0 or 1.

$E^1$ represents phosphorus, arsenic, or antimony.

Each of $R^{53}$ and $R^{54}$ independently represents hydrogen or a hydrocarbon group having 1 to 30 carbon atoms and optionally containing a heteroatom.

$R^{55}$ each independently represents hydrogen, a halogen, or a hydrocarbon group having 1 to 30 carbon atoms and optionally containing a heteroatom.

Each of $R^{56}$ and $R^{57}$ independently represents hydrogen, a halogen, a hydrocarbon group having 1 to 30 carbon atoms and optionally containing a heteroatom, $OR^{52}$, $CO_2R^{52}$, $CO_2M'$, $C(O)N(R^{51})_2$, $C(O)R^{52}$, $SR^{52}$, $SO_2R^{52}$, $SOR^{52}$, $OSO_2R^{52}$, $P(O)(OR^{52})_{2-y}(R^{51})_y$, CN, $NHR^{52}$, $N(R^{52})_2$, $Si(OR^{51})_{3-x}(R^{51})_x$, $OSi(OR^{51})_{3-x}(R^{51})_x$, $NO_2$, $SO_3M'$, $PO_3M'_2$, $P(O)(O^{52})_2M'$, or an epoxy-containing group.

$R^{51}$ represents hydrogen or a hydrocarbon group having 1 to 20 carbon atoms.

$R^{52}$ represents a hydrocarbon group having 1 to 20 carbon atoms.

M' represents an alkali metal, an alkaline earth metal, an ammonium, or a quaternary ammonium or phosphonium, x represents an integer of 0 to 3, and y represents an integer of 0 to 2.

$R^{56}$ and $R^{57}$ are optionally bonded together to form an alicyclic ring, an aromatic ring, or a heterocycle containing a heteroatom selected from oxygen, nitrogen, and sulfur. In this case, the ring is a 5- to 8-membered ring, and optionally has a substituent on the ring.

$L^1$ represents a ligand which has coordinated to M.

$R^{53}$ and $L^1$ are optionally bonded together to form a ring.]

The complex used as a polymerization catalyst is more preferably a transition metal complex represented by the following structural formula (c3).

[Chemical formula 7]

Structural formula (c3)

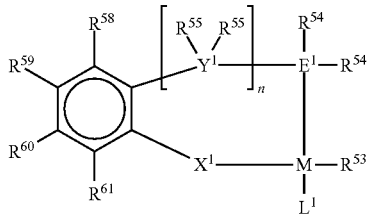

[In the structural formula (c3), M represents a transition metal belonging to any one of Groups 5 to 11 of the Periodic Table of elements, i.e., the above-mentioned various transition metals.

$X^1$ represents oxygen, sulfur, —$SO_3$—, or —$CO_2$—.

$Y^1$ represents carbon or silicon.

n represents an integer of 0 or 1.

$E^1$ represents phosphorus, arsenic, or antimony.

Each of $R^{53}$ and $R^{54}$ independently represents hydrogen or a hydrocarbon group having 1 to 30 carbon atoms and optionally containing a heteroatom.

$R^{55}$ each independently represents hydrogen, a halogen, or a hydrocarbon group having 1 to 30 carbon atoms and optionally containing a heteroatom.

Each of $R^{58}$, $R^{59}$, $R^{60}$, and $R^{61}$ independently represents hydrogen, a halogen, a hydrocarbon group having 1 to 30 carbon atoms and optionally containing a heteroatom, $OR^{52}$, $CO_2R^{52}$, $CO_2M'$, $C(O)N(R^{51})_2$, $C(O)R^{52}$, $SR^{52}$, $SO_2R^{52}$, $SOR^{52}$, $OSO_2R^{52}$, $P(O)(OR^{52})_{2-y}(R^{51})_y$, CN, $NHR^{52}$, $N(R^{52})_2$, $Si(OR^{51})_{3-x}(R^{51})_x$, $OSi(OR^{51})_{3-x}(R^{51})_x$, $NO_2$, $SO_3M'$, $PO_3M'_2$, $P(O)(OR^{52})_2M'$, or an epoxy-containing group.

$R^{51}$ represents hydrogen or a hydrocarbon group having 1 to 20 carbon atoms.

$R^{52}$ represents a hydrocarbon group having 1 to 20 carbon atoms.

M' represents an alkali metal, an alkaline earth metal, an ammonium, or a quaternary ammonium or phosphonium, x represents an integer of 0 to 3, and y represents an integer of 0 to 2.

A plurality of groups appropriately selected from $R^{58}$ to $R^{61}$ are optionally bonded together to form an alicyclic ring, an aromatic ring, or a heterocycle containing a heteroatom selected from oxygen, nitrogen, and sulfur. In this case, the ring is a 5- to 8-membered ring, and optionally has a substituent on the ring.

$L^1$ represents a ligand which has coordinated to M.

$R^{53}$ and $L^1$ are optionally bonded together to form a ring.]

As representative examples of catalysts of transition metal compounds belonging to Groups 5 to 11 having a chelate ligand, catalysts called a SHOP catalyst and a Drent catalyst have been known.

A SHOP catalyst is a catalyst in which a phosphorus ligand having an aryl group optionally having a substituent has coordinated to a nickel metal (see, for example, WO2010-050256).

A Drent catalyst is a catalyst in which a phosphorus ligand having an aryl group optionally having a substituent has coordinated to a palladium metal (see, for example, Japanese Unexamined Patent Publication No. 2010-202647).

Polymerization Method for the Copolymer:

With respect to the polymerization method for the copolymer in the present invention, there is no limitation.

Examples of the polymerization methods include slurry polymerization in which at least part of the formed polymer is in the form of a slurry in a medium, bulk polymerization in which a liquified monomer itself is used as a medium, gas phase polymerization in which polymerization is conducted in a vaporized monomer, and high-pressure ionic polymerization in which at least part of the formed polymer is dissolved in a monomer liquified at a high temperature and a high pressure.

The manner of polymerization may be any of manners of batch polymerization, semi-batch polymerization, and continuous polymerization.

Alternatively, living polymerization may be used, or polymerization in which chain transfer proceeds may be employed.

Further alternatively, using a so-called chain shuttling agent (CSA), a chain shuttling reaction or coordinative chain transfer polymerization (CCTP) may be conducted.

The specific production process and conditions are disclosed in, for example, Japanese Unexamined Patent Publication Nos. 2010-260913 and 2010-202647.

Method for Introducing a Carboxyl Group and/or a Dicarboxylic Anhydride Group into the Copolymer:

With respect to the method for introducing a carboxyl group and/or a dicarboxylic anhydride group into the copolymer in the present invention, there is no particular limitation.

A carboxyl group and/or a dicarboxylic anhydride group can be introduced into the copolymer by various methods as long as the effects aimed at by the present invention are not sacrificed.

As examples of the method for introducing a carboxyl group and/or a dicarboxylic anhydride group into the copolymer, there can be mentioned a method in which a comonomer having a carboxyl group and/or a dicarboxylic anhydride group is directly copolymerized, and a method in which another monomer is copolymerized, and then a carboxyl group and/or a dicarboxylic anhydride group is introduced by modification.

As examples of the method for introducing a carboxyl group and/or a dicarboxylic anhydride group into the copolymer by modification, in the case of introducing, for example, a carboxylic acid, there can be mentioned a method in which an acrylic acid ester is copolymerized and then subjected to hydrolysis to be changed to a carboxylic acid, and a method in which t-butyl acrylate is copolymerized and then changed to a carboxylic acid by heat decomposition.

In the above-mentioned hydrolysis or heat decomposition, as an additive for promoting the reaction, a conventionally known acid or base catalyst may be used. With respect to the acid or base catalyst, there is no particular limitation, but, for example, a hydroxide of an alkali metal or an alkaline earth metal, such as sodium hydroxide, potassium hydroxide, or lithium hydroxide, a carbonate of an alkali metal or an alkaline earth metal, such as sodium hydrogencarbonate or sodium carbonate, a solid acid, such as montmorillonite, an inorganic acid, such as hydrochloric acid, nitric acid, or sulfuric acid, or an organic acid, such as formic acid, acetic acid, benzoic acid, citric acid, paratoluenesulfonic acid, trifluoroacetic acid, or trifluoromethanesulfonic acid, can be appropriately used. From the viewpoint of the reaction promotion effect, cost, corrosion of the apparatus and others, preferred are sodium hydroxide, potassium hydroxide, sodium carbonate, paratoluenesulfonic acid, and trifluoroacetic acid, and more preferred are paratoluenesulfonic acid and trifluoroacetic acid.

(6) Ionomer

The ionomer in the present invention is an ionomer having a substantially linear chain structure, and comprising the copolymer in the present invention, wherein at least part of the carboxyl group and/or dicarboxylic anhydride group of structural units (13) in the copolymer has been converted by the above-mentioned metal ions to a metal-containing carboxylic acid salt containing ions of at least one metal selected from metals belonging to Groups 1, 2, and 12 of the Periodic Table.

Structure of the Ionomer

The ionomer in the present invention is a random copolymer having a substantially linear chain structure which is similar to that of the above-mentioned copolymer in the present invention, and therefore the parameters for the structure of the ionomer are preferably in the same ranges as those of the copolymer. Specifically, with respect to the phase angle δ at a complex modulus absolute value G* of 0.1 MPa, as measured by a rotational rheometer, melting point (Tm, ° C.), and crystallinity (%), the same preferred modes as those for the copolymer are applied to the ionomer. The ionomer is obtained by acting a metal salt on a precursor resin as mentioned below, and, in this instance, generally, such a reaction that breaks the molecular chain of the polymer does not occur. Therefore, parameters for the structure, such as the molar ratio of the comonomer, degree of branching, and randomness, are generally consistent in the precursor resin and the ionomer.

Neutralization Degree (mol %)

The amount of the metal ions contained in the ionomer is preferably an amount that neutralizes at least part of or all of the carboxyl group and/or dicarboxylic anhydride group in the copolymer as a precursor resin, and the neutralization degree (mean neutralization degree) is preferably 5 to 95 mol %, more preferably 10 to 90 mol %, further preferably 20 to 80 mol %.

When the neutralization degree is higher, the ionomer is increased in tensile strength and tensile breaking stress and reduced in tensile breaking strain, but the melt flow rate (MFR) of the ionomer tends to be reduced. On the other hand, when the neutralization degree is lower, the ionomer having an appropriate MFR is obtained and this is more advantageous in view of the moldability, but it is likely that the impact resistance improvement effect for the polyamide resin composition is unsatisfactory.

The neutralization degree can be calculated from the molar ratio of the amount of the carboxyl group and/or dicarboxylic anhydride group and the metal ions added.

Method for Producing the Ionomer

The ionomer in the present invention may be obtained through a conversion step in which the ethylene and/or α-olefin having 3 to 20 carbon atoms/unsaturated carboxylic acid copolymer, which is obtained by the above-mentioned method for introducing a carboxyl group and/or a dicarboxylic anhydride group into the copolymer, is treated with a metal salt containing ions of at least one metal selected from metals belonging to Groups 1, 2, and 12 of the Periodic Table to be converted to a metal-containing carboxylic acid salt. Alternatively, the ionomer in the present invention may be obtained through a heat conversion step in which the ethylene and/or α-olefin having 3 to 20 carbon atoms/unsaturated carboxylic acid ester copolymer is heated to convert at least part of the ester group in the copolymer to a metal-containing carboxylic acid salt containing ions of at least one metal selected from metals belonging to Groups 1, 2, and 12 of the Periodic Table.

When an ionomer is produced after introducing a carboxyl group and/or a dicarboxylic anhydride group into the polymer, the method for producing the ionomer is, for example, as follows. Specifically, the ionomer can be obtained by kneading a material which traps metal ions, such as an ethylene/methacrylic acid (MAA) copolymer, and a metal salt optionally while heating to prepare a source of supply of metal ions, and then adding to a precursor resin of the ionomer the source of supply of metal ions in such an amount that a desired neutralization degree is achieved, and kneading the resultant mixture.

The heat conversion step may be a step in which (i) the ethylene and/or α-olefin having 3 to 20 carbon atoms/unsaturated carboxylic acid ester copolymer is heated and changed by hydrolysis or heat decomposition to an ethylene and/or α-olefin having 3 to 20 carbon atoms/unsaturated carboxylic acid copolymer, and then reacted with a compound containing ions of a metal belonging to Group 1, 2, or 12 of the Periodic Table to convert the carboxylic acid in the ethylene and/or α-olefin having 3 to 20 carbon atoms/unsaturated carboxylic acid copolymer to the metal-containing carboxylic acid salt. Alternatively, the heat conversion step may be a step in which (ii) the ethylene and/or α-olefin having 3 to 20 carbon atoms/unsaturated carboxylic acid ester copolymer is heated and, while subjecting the ester group of the copolymer to hydrolysis or heat decomposition, the copolymer is reacted with a compound containing ions of a metal belonging to Group 1, 2, or 12 of the Periodic Table to convert the ester group portion of the ethylene and/or α-olefin having 3 to 20 carbon atoms/unsaturated carboxylic acid ester copolymer to the metal-containing carboxylic acid salt.

Further, the compound containing metal ions may be, for example, an oxide, a hydroxide, a carbonate, a bicarbonate, an acetate, or a formate of a metal belonging to Group 1, 2, or 12 of the Periodic Table.

The compound containing metal ions may be fed in the form of particles or finely divided powder to the reaction system, or may be dissolved or dispersed in water or an organic solvent and then fed to the reaction system, or a masterbatch using an ethylene/unsaturated carboxylic acid copolymer or an olefin copolymer as a base polymer may be prepared and fed to the reaction system. For permitting the reaction to smoothly proceed, preferred is a method in which a masterbatch is prepared and fed to the reaction system.

Further, the reaction with a compound containing metal ions may be conducted by melt-kneading using various types of apparatuses, such as a vented extruder, a Banbury mixer, or a roll mill, and the reaction may be conducted in a batch-wise manner or in a continuous manner. The reaction can smoothly proceed by removing water and carbon dioxide gas by-produced in the reaction by means of a deaerator, and therefore it is preferred that the reaction is continuously performed using an extruder having a deaerator, such as a vented extruder.

In the reaction with a compound containing metal ions, a small amount of water may be charged for promoting the reaction.

The temperature for heating the ethylene and/or $\alpha$-olefin having 3 to 20 carbon atoms/unsaturated carboxylic acid ester copolymer may be a temperature at which the ester is converted to a carboxylic acid, and, when the heating temperature is too low, the ester is not converted to a carboxylic acid, and, when the heating temperature is too high, decarbonylation or decomposition of the copolymer proceeds. Therefore, the heating temperature in the present invention is preferably in the range of from 80 to 350° C., more preferably 100 to 340° C., further preferably 150 to 330° C., further more preferably 200 to 320° C.

The reaction time varies depending on, e.g., the heating temperature or the reactivity of the ester group portion, but is generally 1 minute to 50 hours, more preferably 2 minutes to 30 hours, further preferably 2 minutes to 10 hours, further more preferably 2 minutes to 3 hours, especially preferably 3 minutes to 2 hours.

In the above step, with respect to the atmosphere for reaction, there is no particular limitation, but generally, the reaction is preferably conducted in an inert gas flow. As an example of inert gas, a nitrogen, argon, or carbon dioxide atmosphere can be used, and a small amount of oxygen or air may be contaminated in the inert gas.

With respect to the reactor used in the above step, there is no particular limitation as long as the copolymer can be substantially uniformly stirred by the method, and a glass vessel equipped with a stirrer, or an autoclave (AC) may be used, and any conventionally known kneading machine, such as Brabender Plastograph, a single-screw or twin-screw extruder, an intensive screw type kneading machine, a Banbury mixer, a kneader, or a roll, can be used.

An IR spectrum of the obtained resin is measured, and, by checking a reduction of the peak ascribed to a carbonyl group of a carboxylic acid (dimer), it is possible to know whether metal ions were introduced into a precursor resin to form an ionomer. The neutralization degree can be determined by, instead of calculation from the above-mentioned molar ratio, similarly checking a reduction of the peak ascribed to a carbonyl group of a carboxylic acid (dimer) and an increase of the peak ascribed to a carbonyl group of a carboxylic acid salt group.

With respect to the amount of the ionomer in the polyamide resin composition, the amount of the ionomer contained is preferably 0.1 to 99.9% by weight, based on the total weight of the ionomer and the above-mentioned polyamide resin. The amount of the ionomer is more preferably in the range of from 0.5 to 99.0% by weight, further preferably in the range of from 1.0 to 95.0% by weight, based on the total weight of the ionomer and the polyamide resin. When the amount of the ionomer is in the above range, the polyamide resin composition can be further improved in impact resistance.

3. Polyamide Resin Composition

The polyamide resin composition of the present invention is a composition comprising the above-mentioned polyamide resin (I) and ionomer resin (II). The polyamide resin composition of the present invention can comprise the above-mentioned two components, but, for introducing other physical properties, a resin other than the above-mentioned polyamide resin (I) and ionomer resin (II) can be incorporated into the polyamide resin composition in such an amount that the effects aimed at by the present invention are not sacrificed. Examples of such resins include polyolefin resins, such as high molecular-weight polyethylene, an ethylene homopolymer, an ethylene-$\alpha$-olefin copolymer, and polypropylene. With respect to the amount of the above resin incorporated, there is no particular limitation as long as the impact resistance achieved by the polyamide resin composition of the present invention is not sacrificed, but the amount of the resin is preferably in the range of from 0 to 200 parts by weight, relative to 100 parts by weight of the total of polyamide resin (I) and ionomer resin (II).

In the resin composition of the present invention, a conventionally known additive, such as an antioxidant, an ultraviolet light absorber, a lubricant, an antistatic agent, a colorant, a pigment, a crosslinking agent, a foaming agent, a nucleating agent, a conductor, or a filler, may be incorporated in such an amount that the effects aimed at by the present invention are not sacrificed. With respect to the amounts of the above additives incorporated, those skilled in the art can use them in their respective appropriate amounts.

The polyamide resin composition of the present invention can be produced by mixing the above-mentioned components in the above-mentioned proportion in an arbitrary order, and kneading and granulating the resultant mixture using a general kneading machine, such as a single-screw extruder, a twin-screw extruder, a super mixer, a Henschel mixer, a Banbury mixer, a roll mixer, Brabender Plastograph, or a kneader. In this instance, it is preferred that a kneading and granulation method that can achieve excellent dispersion of each component is selected, and especially preferred is kneading and granulation using a twin-screw extruder from an economical point of view. In the kneading machine, multi-stage kneading using a plurality of machines by different kneading methods may be employed.

4. Molded Article

An embodiment of the present invention is a molded article using the above-mentioned polyamide resin composition. The polyamide resin composition of the present invention has high impact resistance, and therefore the molded article is effective in various applications that require a physical strength, e.g., automotive parts, such as a spoiler, an air intake duct, an intake manifold, a resonator, a fuel tank, a fuel filler tube, a fuel delivery pipe, and other various types of hoses, tubes, and tanks; mechanical parts, such as an electric tool housing and pipes, electric and electronic parts, household and office supplies, building material-related parts, and parts for furniture. Further, the molded article can also be effectively used in packaging materials, such as a film for food, and products to which an impact is supposed to be applied, such as a golf ball, since the properties of the ionomer are effective for these uses.

EXAMPLES

Hereinbelow, the present invention will be described in more detail with reference to the following Examples and Comparative Examples, which should not be construed as limiting the scope of the present invention. In the following Examples and Comparative Examples, the measurement and evaluation of physical properties were conducted in accordance with the methods described below. In the tables below, "no data" means that no measurement was made, and "not detected" means less than the detection limit.

(1) Melt Flow Rate (MFR)

An MFR was measured under conditions such that the temperature was 190° C. and the load was 21.18 N in accordance with JIS K-7210 (1999), Table 1-Condition 7.

(2) Tensile Impact Strength

1) Method for Preparing a Tensile Impact Strength Test Sample

A specimen was placed in a mold for hot pressing having a thickness of 1 mm, and preheated in a hot pressing machine having a surface temperature of 230° C. for 5 minutes, and then a cycle of application of the pressure and reduction of the pressure was repeated for melting the specimen and for deaeration of the gas remaining in the specimen, and further a pressure of 4.9 MPa was applied to the specimen and maintained for 5 minutes. Then, the specimen was gradually cooled at a rate of 10° C./minute in the state of applying a pressure of 4.9 MPa, and, at a time when the temperature was reduced to around room temperature, the molded plate was removed from the mold. The obtained molded plate was conditioned in an environment at a temperature of 23±2° C. and at a humidity of 50±5% for 48 hours or longer. From the conditioned pressed plate, a test specimen having an ASTM D1822 Type-S shape was punched out and used as a tensile impact strength test sample.

2) Conditions for Tensile Impact Strength Test

Using the above test specimen, a tensile impact strength was measured with reference to JIS K 7160-1996 Method B. Only the shape of a test specimen is different from that in JIS K 7160-1996. Other conditions for measurement were in accordance with the method of JIS K 7160-1996, and a test was conducted according to this method.

(3) Phase Angle $\delta$ at a Complex Modulus Absolute Value $G^*$ of 0.1 MPa (Measurement at $G^*=0.1$ MPa)

1) Preparation of a Sample and Measurement

A specimen was placed in a mold for hot pressing having a thickness of 1.0 mm, and preheated in a hot pressing machine having a surface temperature of 180° C. for 5 minutes, and then a cycle of application of the pressure and reduction of the pressure was repeated for deaeration of the gas remaining in the molten resin, and further a pressure of 4.9 MPa was applied to the resin and maintained for 5 minutes. Then, the resultant specimen was transferred to a pressing machine having a surface temperature of 25° C., and cooled by maintaining it at a pressure of 4.9 MPa for 3 minutes, preparing a pressed plate formed from a specimen having a thickness of about 1.0 mm. The pressed plate formed from the specimen was processed into a circular form having a diameter of 25 mm and used as a sample, and, using rotational rheometer Model ARES, manufactured by Rheometrics, Inc., as a measurement apparatus for dynamic viscoelastic properties, dynamic viscoelastic properties were measured in a nitrogen gas atmosphere under the following conditions.

Plate: $\phi$25 mm (diameter) Parallel plate
Temperature: 160° C.
Strain amount: 10%
Measuring range of circular frequency: $1.0\times10^{-2}$ to $1.0\times10^{2}$ rad/s
Measurement interval: 5 points/decade A phase angle $\delta$ was plotted for the common logarithm log $G^*$ of a complex modulus absolute value $G^*$ (Pa), and a $\delta$ (degree) value of the point corresponding to log $G^*=5.0$ was taken as $\delta$ ($G^*=0.1$ MPa). When the point corresponding to log $G^*=5.0$ was not present in the measured points, a $\delta$ value of the point for log $G^*=5.0$ was determined by linear interpolation using two points around log $G^*=5.0$. Further, when all the measured points were corresponded to log $G^*<5$, a $\delta$ value of the point for log $G^*=5.0$ was determined by extrapolation using a quadratic curve using three points of the larger log $G^*$ values.

(4) Melting Point and Crystallinity

The melting point is indicated by a peak temperature of an endothermic curve measured by a differential scanning calorimeter (DSC). In the measurement, DSC (DSC 7020), manufactured by SII Nano Technology Inc., was used, and the measurement was conducted under the following conditions.

An aluminum pan was packed with about 5.0 mg of a sample, and the temperature was increased to 200° C. at 10° C./minute and maintained at 200° C. for 5 minutes, and then decreased to 30° C. at 10° C./minute. The temperature was maintained at 30° C. for 5 minutes, and then further increased at 10° C./minute, and the maximum peak temperature in the obtained absorption curve was determined as a melting point Tm, and a crystallinity (%) was determined by determining a heat of fusion ($\Delta$H) from the fusion endothermic peak area, and dividing the determined heat of fusion by the heat of fusion (293 J/g) of high density polyethylene (HDPE) perfect crystal.

(5) Method for Measuring the Structural Units Derived from a Carboxyl Group and/or Dicarboxylic Anhydride Group Monomer and the Number of Branches Per 1,000 Carbon Atoms The structural units derived from a carboxyl group and/or dicarboxylic anhydride group monomer and the number of branches per 1,000 carbon atoms in the copolymer are determined using a $^{13}$C-NMR spectrum. $^{13}$C-NMR was measured by the following method.

200 to 300 mg of a sample was placed in an NMR sample tube having an inner diameter of 10 mm$\phi$, together with 2.4 ml of a mixed solvent of o-dichlorobenzene ($C_6H_4Cl_2$) and deuterated bromobenzene ($C_6D_5Br$) ($C_6H_4Cl_2/C_6D_5Br=2/1$ (volume ratio)) and hexamethyldisiloxane as a chemical shift standard substance, and the tube was purged with nitrogen gas and then sealed, and the sample was dissolved by heating to obtain a uniform solution, and the obtained solution was used as a sample for NMR measurement.

The NMR measurement was conducted at 120° C. using NMR apparatus Model AV400M, manufactured by Bruker Japan K.K., having 10 mm$\phi$ CryoProbe attached.

The $^{13}$C-NMR measurement was performed by an inverse gated decoupling method under conditions such that the sample temperature was 120° C., the pulse angle was 90°, the pulse interval was 51.5 seconds, and the accumulation number was 512 or more.

With respect to the chemical shift, the $^{13}$C signal of hexamethyldisiloxane was set to 1.98 ppm, and, using this signal as a reference, chemical shifts of other $^{13}$C signals were determined.

1) Pretreatment of a Sample

When a sample contains a carboxylic acid salt group, the sample was subjected to acid treatment to modify the carboxylic acid salt group to a carboxyl group, and then the resultant sample was used in the measurement. When a sample contains a carboxyl group, the sample was appropriately subjected to an esterification treatment, such as methyl-esterification using, for example, diazomethane or trimethylsilyl(TMS)diazomethane.

2) Calculation of the Structural Units Derived from a Monomer Having a Carboxyl Group and/or a Dicarboxylic Anhydride Group <E/tBA>

In the $^{13}$C-NMR spectrum, a quaternary carbon signal of the t-butyl acrylate group of tBA is detected at 79.6 to 78.8. Using the signal intensity, a comonomer content was calculated from the following formula.

tBA total amount (mol %)=$I$(tBA)×100/[$I$(tBA)+$I$(E)]

I(tBA) and I(E) are amounts represented by the following respective formulae.

$I(tBA)=I_{79.6 \text{ to } 78.8}$ $I(E)=(I_{180.0 \text{ to } 135.0}+I_{120.0 \text{ to } 5.0}-I(tBA)\times 7)/2$ <E/tBA/iBA>

In the $^{13}$C-NMR spectrum, a quaternary carbon signal of the t-butyl acrylate group of tBA is detected at 79.6 to 78.8 ppm, a methylene signal of the isobutoxy group of iBA is detected at 70.5 to 69.8 ppm, and a methyl signal of the isobutoxy group is detected at 19.5 to 18.9 ppm. Using these signal intensities, a comonomer content was calculated from the following formulae.

tBA total amount (mol %)=$I$(tBA)×100/[$I$(tBA)+$I$(iBA)+$I$(E)]

iBA total amount (mol %)=$I$(iBA)×100/[$I$(tBA)+$I$(iBA)+$I$(E)]

I(tBA), I(iBA), and I(E) are amounts represented by the following respective formulae.

$I(tBA)=I_{79.6 \text{ to } 78.8}$ $I(iBA)=(I_{70.5 \text{ to } 69.8}+I_{19.5 \text{ to } 18.9})/3$ $I(E)=(I_{180.0 \text{ to } 135.0}+I_{120.0 \text{ to } 5.0}-I(iBA)\times 7-I(tBA)\times 7)/2$ <E/tBA/NB>

In the $^{13}$C-NMR spectrum, a quaternary carbon signal of the t-butyl acrylate group of tBA is detected at 79.6 to 78.8 ppm, and a methine carbon signal of NB is detected at 41.9 to 41.1 ppm. Using these signal intensities, a comonomer content was calculated from the following formulae.

tBA total amount (mol %)=$I$(tBA)×100/[$I$(tBA)+$I$(NB)+$I$(E)]

NB total amount (mol %)=$I$(NB)×100/[$I$(tBA)+$I$(NB)+$I$(E)]

I(tBA), I(NB), and I(E) are amounts represented by the following respective formulae.

$I(tBA)=I_{79.6 \text{ to } 78.8}$ $I(NB)=(I_{41.9 \text{ to } 41.1})/2$ $I(E)=(I_{180.0 \text{ to } 135.0}+I_{120.0 \text{ to } 5.0}-I(NB)\times 7-I(tBA)\times 7)/2$ When a structural unit content for each monomer is represented by "<0.1" including an inequal sign, this means that the monomer is present as constituent units in the multi-component copolymer, but the content is less than 0.1 mol %, taking the effective digit into consideration.

3) Calculation of the Number of Branches Per 1,000 Carbon Atoms

When branches are present in the multi-component copolymer, there are branches of an isolated type such that a branch is present alone in the principal chain, and branches of a composite type (including a facing type such that a branch and another branch face to each other through the principal chain, a branched-branch type such that a branch is present in a branched chain, and a chain type).

Examples of the structure of ethyl branch are shown below. In the example of a facing type, R represents an alkyl group.

[Chemical formula 8]

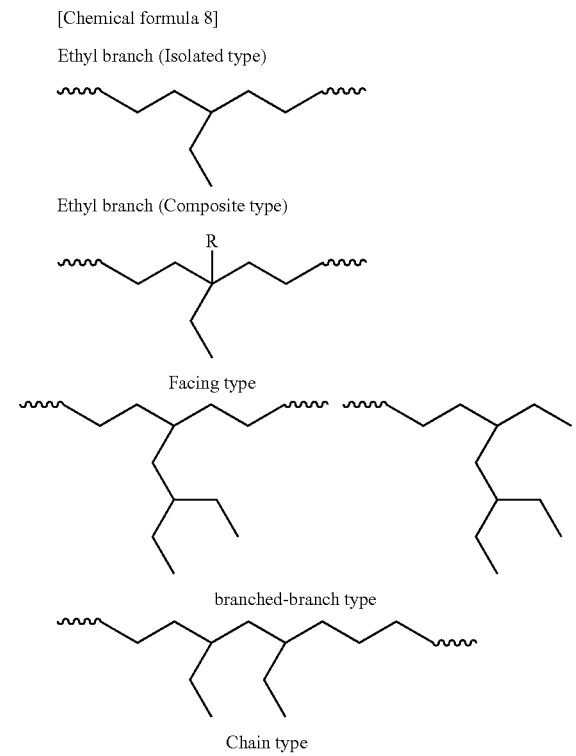

Ethyl branch (Isolated type)

Ethyl branch (Composite type)

Facing type branched-branch type

Chain type

The number of branches per 1,000 carbon atoms is determined by substituting any one of the below-shown I(B1), I(B2), and I(B4) for the I(Branch) member in the formula below. B1 indicates methyl branch, B2 indicates ethyl branch, and B4 indicates butyl branch. The number of methyl branches is determined using I(B1), the number of ethyl branches is determined using I(B2), and the number of butyl branches is determined using I(B4).

Number of branches (Number/per 1,000 carbon atoms)=$I$(Branch)×1,000/$I$(total)

I(total), I(B1), I(B2), and I(B4) are amounts represented by the following respective formulae.

$$I(total) = I_{180.0 \text{ to } 135.0} + I_{120.0 \text{ to } 5.0}$$

$$I(B1) = (I_{20.0 \text{ to } 19.8} + I_{33.2 \text{ to } 33.1} + I_{37.5 \text{ to } 37.3})/4$$

$$I(B2) = I_{8.6 \text{ to } 7.6} + I_{11.8 \text{ to } 10.5}$$

$$I(B4) = I_{14.3 \text{ to } 13.7} - I_{32.2 \text{ to } 32.0}$$

In the above formulae, I represents an integral intensity, and the values of subscripts for I indicate the range of chemical shift. For example, 1180.0 to 135.0 indicates an integral intensity of the $^{13}C$ signal detected between 180.0 ppm and 135.0 ppm.

Identification was made with reference to Macromolecules 1984, 17, 1756-1761, and Macromolecules 1979, 12, 41, which are non-patent documents.

When the number of branches is represented by "<0.1" including an inequal sign, this means that a branch is present as constituent units in the multi-component copolymer, but the content is less than 0.1 mol %, taking the effective digit into consideration. The "not detected" shown in the tables means less than the detection limit.

(Production Example 1): Synthesis of a B-27DM/Ni Complex

In a B-27DM/Ni complex, in accordance with Synthesis Example 4 described in International Patent Publication No. 2010/050256, the below-shown 2-bis(2,6-dimethoxyphenyl) phosphano-6-pentafluorophenylphenol ligand (B-27DM) was used. In accordance with Example 1 of International Patent Publication No. 2010/050256, using bis(1,5-cyclooctadiene)nickel (0) (which is referred to as "Ni(COD)$_2$"), a nickel complex (B-27DM/Ni) having B-27DM and Ni(COD)$_2$ which are reacted in a 1:1 ratio was synthesized.

[Chemical formula 9]

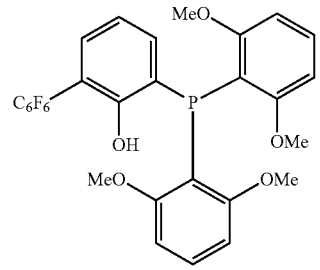

B-27DM (Production Example 2, Production Example 3, Production Example 10, Production Example 11): Production of a Copolymer for Ionomer Precursor Resin Using the transition metal complex (B-27DM/Ni complex) prepared in Production Example 1, an ethylene/t-Bu acrylate/2-norbornene copolymer (Production Example 2), an ethylene/t-Bu acrylate/i-Bu acrylate copolymer (Production Example 3), and an ethylene/t-Bu acrylate copolymer (Production Example 10, Production Example 11) were produced. Production of the copolymers was conducted with reference to Production Example 1 or Production Example 3 described in Japanese Unexamined Patent Publication No. 2016-79408. The conditions for production which were appropriately changed, for example, the metal catalyst type, metal catalyst amount, trioctylaluminum (TNOA) amount, toluene amount, comonomer type, comonomer content, ethylene partial pressure, polymerization temperature, and polymerization time, and the results of the production are shown in Table 1, and the physical properties of the obtained copolymers are shown in Table 2.

The compositions of the resins in Production Examples 2 and 3 were applied to the formula for randomness of the copolymer, and, as a result, values of 100.08 and 101.20 were respectively obtained. Further, the compositions of the resins in Production Examples 10 and 11 were applied to the formula for randomness of the copolymer, and, as a result, values of 116.9 and 116.4 were respectively obtained. These values are larger than the melting point values of the obtained resins and satisfy the above-mentioned relationship represented by the formula: $50 < Tm < -3.74 \times [Z] + 130$, and therefore both the resins in Production Examples 2 and 3 can be judged to be a resin having high randomness.

TABLE 1

|  |  | Production Example 2 | Production Example 3 | Production Example 10 | Production Example 11 |
| --- | --- | --- | --- | --- | --- |
| Raw material formulation | Comonomer 1 | t-Butyl acrylate | t-Butyl acrylate | t-Butyl acrylate | t-Butyl acrylate |
|  | Comonomer 2 | 2-Norbornene | i-Butyl acrylate | — | — |
|  | Comonomer 1 concentration (mmol/L) | 230 | 147 | 135 | 147 |
|  | Comonomer 2 concentration (mmol/L) | 210 | 66 | — | — |
|  | Metal complex amount (mmol) | 1000 | 1460 | 550 | 550 |
|  | TNOA (mmol) | 225 | 3570 | 136 | 280 |
|  | Toluene (L) | 1000 | 1000 | 1000 | 1000 |
| Polymerization conditions | Ethylene partial pressure (MPa) | 0.8 | 0.8 | 0.8 | 0.8 |
|  | Temperature (° C.) | 85 | 95 | 102 | 105 |
|  | Time (min) | 330 | 510 | 200 | 240 |
| Yield (kg) |  | 117 | 75 | 93 | 107 |

TABLE 2

|  |  | Production Example 2 | Production Example 3 | Production Example 10 | Production Example 11 |
|---|---|---|---|---|---|
| Physical properties of copolymer for precursor | Comonomer 1 content (mol %) | 5.1 | 5.4 | 3.5 | 3.6 |
|  | Comonomer 2 content (mol %) | 2.9 | 2.3 | 0 | 0 |
|  | Melting point (° C.) | 81 | 81 | 104 | 103 |
|  | Crystallinity (%) | 15 | 12 | 33 | 33 |
|  | Phase angle δ (°) at G* = 0.1 MPa | 65 | 62 | 67 | 68 |
|  | Methyl branch (Number/total 1000 C) | 0.5 | not detected | 1.1 | 1.6 |
|  | Ethyl branch (Number/total 1000 C) | not detected | not detected | not detected | not detected |
|  | Butyl branch (Number/total 1000 C) | not detected | not detected | not detected | not detected |

(Production Example 4, Production Example 5, Production Example 12, Production Example 13): Production of an Ionomer Precursor Resin Into an autoclave made of SUS 316L having an internal volume of 1.6 m³ and having an agitating blade were charged 100 kg of one of the resins obtained in Production Example 2, Production Example 3, Production Example 10, and Production Example 11, 2.0 kg of paratoluenesulfonic acid monohydrate, and 173 L of toluene, and the resultant mixture was stirred at 105° C. for 4 hours. 173 L of ion-exchanged water was added and the resultant mixture was stirred and allowed to stand, and then the aqueous layer was withdrawn. Subsequently, an operation of the addition of ion-exchanged water and withdrawal of the aqueous layer was repeated until the pH of the withdrawn aqueous layer became 5 or more. The remaining solution was charged into a 42 mmϕ vented twin-screw extruder (L/D=42), and the extruder was evacuated from the vent into a vacuum to distill off the solvent. Further, the resin continuously extruded into a strand form from the dice at the end of the extruder was cooled in water and cut by means of a cutter, obtaining a resin in the form of pellets.

In the IR spectrum of the obtained resin, disappearance of the peak around 850 cm⁻¹ ascribed to a t-Bu group, a reduction of the peak around 1,730 cm⁻¹ ascribed to a carbonyl group of an ester, and an increase of the peak around 1,700 cm⁻¹ ascribed to a carbonyl group of a carboxylic acid (dimer) were observed. This confirmed decomposition of the t-Bu ester and formation of a carboxylic acid, and the resins in Production Example 4, Production Example 5, Production Example 12, and Production Example 13 were obtained. The physical properties of the obtained precursor resins are shown in Table 3.

TABLE 3

|  |  | Production Example 4 | Production Example 5 | Production Example 12 | Production Example 13 |
|---|---|---|---|---|---|
| Physical properties of precursor resin | Comonomer 1 content (mol %) | 5.1 | 5.4 | 3.5 | 3.6 |
|  | Comonomer 2 content (mol %) | 2.9 | 2.3 | 0 | 0 |
|  | Melting point (° C.) | 84 | 88 | 108 | 107 |
|  | Crystallinity (%) | 20 | 19 | 37 | 39 |
|  | Phase angle δ (°) at G* = 0.1 MPa | 62 | 64 | 64 | 61 |
|  | Methyl branch (Number/total 1000 C) | 0.5 | not detected | 1.1 | 1.6 |
|  | Ethyl branch (Number/total 1000 C) | not detected | not detected | not detected | not detected |
|  | Butyl branch (Number/total 1000 C) | not detected | not detected | not detected | not detected |

(Production Examples 6 to 9, Production Examples 14 to 16) Production of an Ionomer 1) Preparation of a Na Ion Supply Source Into LABO PLASTOMILL: Model roller mixer R60, manufactured by Toyo Seiki Seisaku-Sho, Ltd., which was equipped with a small-size mixer having a capacity of 60 ml, were charged 22 g of an ethylene/methacrylic acid (MAA) copolymer (manufactured by Dow-Mitsui Polychemicals Co., Ltd.; grade: Nucrel N1050H) and 18 g of sodium carbonate, and the resultant mixture was kneaded at 180° C. and at 40 rpm for 3 minutes to prepare a Na ion supply source.

2) Preparation of a Zn Ion Supply Source

Into LABO PLASTOMILL: Model roller mixer R60, manufactured by Toyo Seiki Seisaku-Sho, Ltd., which was equipped with a small-size mixer having a capacity of 60 ml, were charged 21.8 g of an ethylene/methacrylic acid (MAA) copolymer (manufactured by Dow-Mitsui Polychemicals Co., Ltd.; grade: Nucrel N1050H), 18 g of zinc oxide, and 0.2 g of zinc stearate, and the resultant mixture was kneaded at 180° C. and at 40 rpm for 3 minutes to prepare a Zn ion supply source.

3) Preparation of an Ionomer

Into LABO PLASTOMILL: Model roller mixer R60, manufactured by Toyo Seiki Seisaku-Sho, Ltd., which was equipped with a small-size mixer having a capacity of 60 ml, was charged 40 g of an ionomer precursor resin, and the resin was kneaded at 160° C. and at 40 rpm for 3 minutes and dissolved. Then, an ion supply source was charged so that the resultant mixture had a desired neutralization degree, and the mixture was kneaded at 250° C. and at 40 rpm for 5 minutes. In the preparation of an ionomer, the types of the ionomer precursor resins were selected from Production Example 4 and Production Example 5, and Production Example 12 and Production Example 13, and Na and Zn were used in combination as an ion supply source, preparing ionomers in Production Examples 6 to 9 and Production Examples 14 to 16. From the IR spectrum of each of the ionomers obtained in the Production Examples, it was found that the peak around 1,700 $cm^{-1}$ ascribed to a carbonyl group of a carboxylic acid (dimer) was reduced, and the peak around 1,560 $cm^{-1}$ ascribed to a carbonyl group of a carboxylic acid salt group was increased. The physical properties of the obtained ionomers are shown in Table 4.

Example 1/Preparation of a Polyamide Resin Composition

Into LABO PLASTOMILL: Model roller mixer R60, manufactured by Toyo Seiki Seisaku-Sho, Ltd., which was equipped with a small-size mixer having a capacity of 60 ml, were charged 44 g of a polyamide (manufactured by Toray Industries Inc.; trade name: Amilan (registered trademark); grade: CM6246M) resin and 11 g of the ionomer in Production Example 6, and the resultant mixture was kneaded at 230° C. and at 50 rpm for 5 minutes. The resin composition was removed from the kneading machine and cooled to obtain a resin composition in Example 1.

Examples 2 to 8, Comparative Examples 1 to 6, Examples 9 to 15, Comparative Example 8, Comparative Example 9/Preparation of a Polyamide Resin Composition Resin compositions in Examples 2 to 8, Examples 9 to 15, Comparative Examples 1 to 6, Comparative Example 8, and Comparative Example 9 were individually obtained by substantially the same method as in Example 1 except that the type and amount of the polyamide resin, the type and amount of the ionomer, and the type and amount of the ionomer precursor resin were changed to those shown in Tables 5 and 6. With respect to HIM1605, HIM1707, HIM1555, and HIM1707 shown in Tables 5 and 6, the respective grades of HIMILAN, manufactured by Dow-Mitsui Polychemicals Co., Ltd., were used. In Examples 12 to 15, polyamide 12 (manufactured by Ems-Chemie Holding AG; grade: Grilamid L25AH) was used. The "no data" shown in the table means that there is no information and data is unknown.

Comparative Example 7

Into LABO PLASTOMILL: Model roller mixer R60, manufactured by Toyo Seiki Seisaku-Sho, Ltd., which was equipped with a small-size mixer having a capacity of 60 ml, was charged 55 g of polyamide (manufactured by Toray Industries Inc.; trade name: Amilan (registered trademark); grade: CM6246M) only, and the polyamide was kneaded at 230° C. and at 50 rpm for 5 minutes. The resin composition was removed from the kneading machine and cooled to obtain a resin composition in Comparative Example 7.

Comparative Example 10

Into LABO PLASTOMILL: Model roller mixer R60, manufactured by Toyo Seiki Seisaku-Sho, Ltd., which was equipped with a small-size mixer having a capacity of 60 ml, was charged 55 g of polyamide 12 (manufactured by Ems-Chemie Holding AG; grade: Grilamid L25AH) only, and the polyamide was kneaded at 230° C. and at 50 rpm for 5 minutes. The resin composition was removed from the kneading machine and cooled to obtain a resin composition in Comparative Example 7.

TABLE 4

| Ionomer resin Production Example Commercially available grade | Base resin | Metal type | Neutralization degree mol % | MFR g/10 min | Melting point ° C. | Crystallinity % | Phase angle δ at G* = 0.1 MPa ° |
|---|---|---|---|---|---|---|---|
| Production Example 6 | Production Example 4 | Na | 30 | 1.7 | 85 | 15 | 61 |
| Production Example 7 | Production Example 5 | Na | 45 | 11.0 | 86 | 16 | 55 |
| Production Example 8 | Production Example 4 | Zn | 10 | 5.0 | 85 | 18 | 61 |
| Production Example 9 | Production Example 5 | Zn | 35 | 32.6 | 83 | 15 | 55 |
| Production Example 14 | Production Example 12 | Na | 20 | 2.9 | 107 | 37 | 59 |
| Production Example 15 | Production Example 13 | Zn | 10 | 4.9 | 107 | 38 | 57 |
| Production Example 16 | Production Example 13 | Na | 13 | 8.3 | 107 | 36 | 60 |
| HIM 1605 | No data | Na | 30 | 2.8 | 91 | 18 | 46 |
| HIM 1707 | No data | Na | 54 | 0.9 | 86 | 10 | 47 |
| HIM 1555 | No data | Na | 38 | 10.0 | 95 | 23 | 49 |
| HIM 1652 | No data | Zn | 17 | 5.5 | 97 | 28 | 41 |

TABLE 5

| Run No. | Unit | Example 1 | Example 2 | Example 3 | Example 4 | Example 5 | Example 6 | Example 7 | Example 8 |
|---|---|---|---|---|---|---|---|---|---|
| Production Example 4 | g | | | | | | | | |
| Production Example 5 | | | | | | | | | |
| Production Example 6 | | 11.0 | | | | | | | |
| Production Example 7 | | | 11.0 | | | | | | |
| Production Example 8 | | | | 5.5 | 11.0 | 22.0 | | | |
| Production Example 9 | | | | | | | 5.5 | 11.0 | 22.0 |
| HIM 1605 | | | | | | | | | |
| HIM 1707 | | | | | | | | | |
| HIM 1555 | | | | | | | | | |
| HIM 1652 | | | | | | | | | |
| CM6246M | | 44.0 | 44.0 | 49.5 | 44.0 | 33.0 | 49.5 | 44.0 | 33.0 |
| Tensile impact strength | kJ/m² | 370 | 310 | 360 | 390 | 390 | 250 | 260 | 310 |

| Run No. | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Production Example 4 | | | | | 11.0 | | |
| Production Example 5 | | | | | | 11.0 | |
| Production Example 6 | | | | | | | |
| Production Example 7 | | | | | | | |
| Production Example 8 | | | | | | | |
| Production Example 9 | | | | | | | |
| HIM 1605 | 11.0 | | | | | | |
| HIM 1707 | | 11.0 | | | | | |
| HIM 1555 | | | 11.0 | | | | |
| HIM 1652 | | | | 11.0 | | | |
| CM6246M | 44.0 | 44.0 | 44.0 | 44.0 | 44.0 | 44.0 | 55.0 |
| Tensile impact strength | 170 | 180 | 90 | 200 | 160 | 190 | 150 |

TABLE 6

| Run No. | Unit | Example 9 | Example 10 | Example 11 | Example 12 | Example 13 | Example 14 | Example 15 | Comparative Example 8 | Comparative Example 9 | Comparative Example 10 |
|---|---|---|---|---|---|---|---|---|---|---|---|
| Production Example 14 | g | 11.0 | | | | | | | | | |
| Production Example 15 | | | 11.0 | | | | | | | | |
| Production Example 16 | | | | 11.0 | | | | | | | |
| Production Example 9 | | | | | 11.0 | | | | | | |
| Production Example 7 | | | | | | 5.5 | 11.0 | 22.0 | | | |
| HIM 1555 | | | | | | | | | 11.0 | | |
| HIM 1652 | | | | | | | | | | 11.0 | |
| CM6246M | | 44.0 | 44.0 | 44.0 | | | | | | | |
| L25AH | | | | | 44.0 | 49.5 | 44.0 | 33.0 | 44.0 | 44.0 | 55.0 |
| Tensile impact strength | kJ/m² | 280 | 270 | 300 | 230 | 210 | 190 | 340 | 100 | 120 | 80 |

4. Observations on the Examples/Comparative Examples

Examples 1 to 11 correspond to a polyamide resin composition which satisfies the requirements of the present invention, and which exhibits high impact resistance. The polyamide resin compositions in Examples 3 to 8 individually exhibit excellent impact resistance, despite having different compositions of the resin, and this shows that, irrespective of the amount of the ionomer added, the polyamide resin compositions have an improvement effect for impact resistance. On the other hand, Comparative Example 7 corresponds to a polyamide resin alone, which exhibits poor impact resistance. In Comparative Examples 1 to 4, an ionomer having a structure containing a large amount of long-chain branches, and having a phase angle of less than 50°, which does not satisfy the requirements of the present invention, is blended with the polyamide resin, and therefore the improvement of the impact resistance is not satisfactory. Particularly, Comparative Example 3 shows that a conventional ionomer lowers the impact resistance. In Comparative Examples 5 and 6, a precursor resin of the ionomer is blended with the polyamide resin, and therefore the improvement of the impact resistance is not satisfactory.

Examples 12 to 15 correspond to a polyamide resin composition which satisfies the requirements of the present invention, and which exhibits high impact resistance. This fact shows that, irrespective of the type of the polyamide resin, the polyamide resin composition which satisfies the requirements of the present invention has an improvement effect for impact resistance. On the other hand, Comparative Example 10 corresponds to a polyamide resin alone, which exhibits poor impact resistance. In Comparative Examples 8 and 9, an ionomer having a structure containing a large amount of long-chain branches, and having a phase angle of less than 50°, which does not satisfy the requirements of the present invention, is blended with the polyamide resin, and therefore the improvement of the impact resistance is not satisfactory.

The above-mentioned excellent results of the Examples and comparison of them to the Comparative Examples clearly show that the constitution of the present invention (matter to define the invention) is significant and rational, and superior to the prior art.

INDUSTRIAL APPLICABILITY

The polyamide resin composition using the ionomer in the present disclosure has excellent impact resistance, as compared to a conventional resin. Therefore, the present invention can be effectively used in various types of molded articles, particularly, automotive parts, an electric tool housing, mechanical parts, electric and electronic parts, household and office supplies, building material-related parts, parts for furniture, packaging materials, and a golf ball.

The invention claimed is:

1. A polyamide resin composition consisting of a polyamide resin (I) and an ionomer (II), wherein:
the polyamide resin (I) is a polymer obtained from:
at least one lactam selected from the group consisting of ε-caprolactam, enantholactam, and lauryllactam;
at least one aminocarboxylic acid selected from the group consisting of 6-aminocaproic acid, 7-aminoheptanoic acid, 8-aminooctanoic acid, 9-aminononanoic acid, 11-aminoundecanoic acid, and 12-aminododecanoic acid; or
at least one combination of a diamine and a dicarboxylic acid, wherein:
the diamine is selected from the group consisting of 1,4-butanediamine, 1,5-pentanediamine, 1,6-hexanediamine, 1,5-hexanediamine, 1,9-nonanediamine, 1,11-undecanediamine, 1,12-dodecanediamine, α,ω-diaminopolypropylene glycol, m-phenylenediamine, and p-phenylenediamine, and
the dicarboxylic acid is selected from the group consisting of adipic acid, sebacic acid, dodecanedioic acid, glutaric acid, terephthalic acid, and isophthalic acid; and
the ionomer (II) is an ionomer which satisfies the following requirements:
the ionomer is derived from a copolymer (P) which comprises, as essential constituent units, structural units (A) derived from ethylene and/or an α-olefin having 3 to 20 carbon atoms and structural units (B) derived from a monomer having a carboxyl group and/or a dicarboxylic anhydride group, wherein at least part of the carboxyl group and/or dicarboxylic anhydride group in the copolymer (P) has been converted to a metal-containing carboxylic acid salt containing ions of at least one metal selected from metals belonging to Groups 1, 2, and 12 of the Periodic Table, and wherein the ionomer has a phase angle δ of 50 to 75 degrees at a complex modulus absolute value G* of 0.1 MPa, as measured by a rotational rheometer.

2. The polyamide resin composition according to claim 1, wherein the number of methyl branches in the copolymer (P) is 50 or less per 1,000 carbon atoms, as determined by $^{13}$C-NMR.

3. The polyamide resin composition according to claim 1, wherein the number of methyl branches in the copolymer (P) is 5 or less per 1,000 carbon atoms, as determined by $^{13}$C-NMR.

4. The polyamide resin composition according to claim 1, wherein the copolymer (P) contains therein the structural units (B) in an amount of 2 to 20 mol %.

5. The polyamide resin composition according to claim 1, wherein the structural units (A) are structural units derived from ethylene.

6. The polyamide resin composition according to claim 1, wherein the copolymer (P) is produced using a transition metal catalyst comprising a transition metal belonging to Groups 8 to 11 of the Periodic Table.

7. The polyamide resin composition according to claim 6, wherein the transition metal catalyst comprises:
a phosphorus-sulfonic acid ligand or a phosphorus-phenol ligand, and nickel or palladium.

8. The polyamide resin composition according to claim 1, wherein the compositional ratios of the polyamide resin (I) and the ionomer (II) are in the following respective ranges:
polyamide resin (I): 0.1 to 99.9% by weight; and
ionomer resin (II): 99.9 to 0.1% by weight.

9. A molded article which is obtained by molding the polyamide resin according to claim 1.

10. The polyamide resin composition according to claim 1, wherein the compositional ratios of the polyamide resin (I) and the ionomer (II) are in the following ranges:
polyamide resin (I): 60 to 99% by weight; and
ionomer resin (II): 40 to 1% by weight.

11. A polyamide resin composition consisting of a polyamide resin (I) and an ionomer (II), wherein:
the polyamide resin (I) is any one of following:
a polymer obtained by ring-opening polymerization of at least one lactam selected from the group consisting of ε-caprolactam, enantholactam, and lauryllactam;
a polymer obtained by polycondensation of at least one aminocarboxylic acid selected from the group consisting of 6-aminocaproic acid, 7-aminoheptanoic acid, 8-aminooctanoic acid, 9-aminononanoic acid, 11-aminoundecanoic acid, and 12-aminododecanoic acid; and
a polymer obtained by polycondensation of at least one diamine and a dicarboxylic acid, wherein:
the diamine is selected from the group consisting of 1,4-butanediamine, 1,5-pentanediamine, 1,6-hexanediamine, 1,5-hexanediamine, 1,9-nonanediamine, 1,11-undecanediamine, 1,12-dodecanediamine, α,ω-diaminopolypropylene glycol, m-phenylenediamine, and p-phenylenediamine, and
the dicarboxylic acid is selected from the group consisting of adipic acid, sebacic acid, dodecanedioic acid, glutaric acid, terephthalic acid, and isophthalic acid; and
the ionomer (II) is an ionomer which satisfies the following requirements:
the ionomer is derived from a copolymer (P) which comprises, as essential constituent units, structural units (A) derived from ethylene and/or an α-olefin having 3 to 20 carbon atoms and structural units (B) derived from a monomer having a carboxyl group and/or a dicarboxylic anhydride group, wherein at least part of the carboxyl group and/or dicarboxylic anhydride group in the copolymer (P) has been converted to a metal-containing carboxylic acid salt containing ions of at least one metal selected from metals belonging to Groups 1, 2, and 12 of the Periodic Table, and wherein the ionomer has a phase angle δ of 50 to 75 degrees at a complex modulus absolute value G* of 0.1 MPa, as measured by a rotational rheometer.

* * * * *